(12) United States Patent
Luukkala

(10) Patent No.: US 10,389,722 B2
(45) Date of Patent: Aug. 20, 2019

(54) ACCESS RELATIONSHIPS IN A COMPUTER SYSTEM

(71) Applicant: SSH Communications Security OYJ, Helsinki (FI)

(72) Inventor: Vesa Luukkala, Helsinki (FI)

(73) Assignee: SSH Communications Security OYJ, Helsinki (FI)

( * ) Notice: Subject to any disclaimer, the term of this patent is extended or adjusted under 35 U.S.C. 154(b) by 204 days.

(21) Appl. No.: 15/394,878

(22) Filed: Dec. 30, 2016

(65) Prior Publication Data
US 2018/0191726 A1    Jul. 5, 2018

(51) Int. Cl.
H04L 29/06 (2006.01)
H04L 12/26 (2006.01)
H04L 29/08 (2006.01)

(52) U.S. Cl.
CPC .......... *H04L 63/101* (2013.01); *H04L 43/062* (2013.01); *H04L 63/0281* (2013.01); *H04L 63/0428* (2013.01); *H04L 63/083* (2013.01); *H04L 63/0823* (2013.01); *H04L 63/105* (2013.01); *H04L 63/1466* (2013.01); *H04L 63/166* (2013.01); *H04L 67/10* (2013.01)

(58) Field of Classification Search
CPC . H04L 43/062; H04L 63/105; H04L 63/0281; H04L 63/166; H04L 63/101; H04L 63/083; H04L 63/0823; H04L 63/0428; H04L 63/1466; H04L 67/10
See application file for complete search history.

(56) References Cited

U.S. PATENT DOCUMENTS

| 7,487,283 | B2* | 2/2009 | Sivertsen | G06F 13/409 710/301 |
| 7,788,707 | B1 | 8/2010 | Zhou | |
| 8,015,594 | B2 | 9/2011 | Salowey et al. | |
| 8,214,884 | B2 | 7/2012 | Xia et al. | |
| 8,539,562 | B2 | 9/2013 | Bolik et al. | |
| 8,560,828 | B2* | 10/2013 | Signaoff | H04L 29/12367 713/150 |
| 8,781,130 | B2 | 7/2014 | Burbridge et al. | |

(Continued)

FOREIGN PATENT DOCUMENTS

| EP | 1906615 A1 | 4/2008 |
| EP | 3067815 A1 | 9/2016 |

OTHER PUBLICATIONS

May 2, 2018—(EP) European Search Report of EP Application No. 17209951.7.

(Continued)

*Primary Examiner* — Amir Mehrmanesh
(74) *Attorney, Agent, or Firm* — Banner & Witcoff, Ltd.

(57) ABSTRACT

The disclosure relates to access relationships, more particularly to controlling access relationships between entities in a computerized system. In the disclose arrangement a first access relationship between a first entity and a second entity is determined. At least one intermediate entity is selected for routing of a second access relationship between the first entity and the second entity via the at least one intermediate entity. The second access relationship is created, the second access relationship comprising a chain of access relationships via the first entity, the at least one intermediate entity and the second entity.

15 Claims, 21 Drawing Sheets

(56) References Cited

U.S. PATENT DOCUMENTS

| | | | |
|---|---|---|---|
| 2005/0108024 A1 | 5/2005 | Fawcett et al. | |
| 2005/0201370 A1* | 9/2005 | Poyhonen | H04L 29/12537 370/389 |
| 2006/0117389 A1* | 6/2006 | Pool | G06F 21/6245 726/27 |
| 2007/0061125 A1 | 3/2007 | Bhatt et al. | |
| 2010/0153471 A1 | 6/2010 | Bybee et al. | |
| 2011/0182427 A1 | 7/2011 | Long et al. | |
| 2014/0317409 A1* | 10/2014 | Bartok | H04L 63/06 713/171 |
| 2015/0222604 A1* | 8/2015 | Ylonen | H04L 63/062 713/171 |

OTHER PUBLICATIONS

Jun. 30, 2011—(EP)—Ping Zhang et al., "Survey of Trust Management on Various Networks", Complex, Intelligent and Software Intensive Systems, IEEE, pp. 219-226, XP032036575.

Aug. 9, 2018 U.S. Final Office Action—U.S. Appl. No. 15/394,871.

Feb. 2, 2018 U.S.—Non-Final Office Action—U.S. Appl. No. 15/394,871.

Jan. 14, 2019 U.S. Non-Final Office Action—U.S. Appl. No. 15/394,871.

Napier, James A., "Secure Automation: Achieving Least Privilege with SSH, Sudo and Setuid," 2004 LISA XVIII, Nov. 14-19, 2014, Atlanta, Georgia, retrieved Feb. 9, 2019 from https://www.usenix.org/legacy/event/lisa04/tech/full_papers/napier/napier.pdf, 10 pages.

Thorpe, Christopher, "SSU Extending SSH for Secure Root Administration," Proceeding of the Twelfth Systems Administration Conference (LISA '98), Dec. 6-11, 1998, Boston, Massachusetts, retrieved Feb. 9, 2019 from http://static.usenix.org/event/lisa98/full_papers/thorpe/thorpe.pdf, 11 pages.

* cited by examiner

ACCESS RELATIONSHIPS IN A COMPUTER SYSTEM

FIELD OF THE INVENTION

This disclosure relates to access relationships in a computer system.

BACKGROUND

Large computing environments can comprise a plurality of entities such as computing devices, user accounts and users. Computer devices are often called hosts. A host may also be a virtual computing device (a virtual machine) or a container such as a Linux™ container or equivalent within a physical computing device. Each host may comprise or be associated with one or more user accounts, processes, and/or files. Hosts, user accounts, and other entities in the environment may be associated with groups, e.g., user groups.

Various arrangements for accessing entities in computing environment by other entities can be configured. Example of these include web-based access, security protocol (e.g. secure shell protocol; SSH) based access, file transfer access, remote procedure call access, and/or software upgrade access. Such access may be used by, e.g., end users, automation, and/or by system administrators.

Configuring and/or gaining access to a particular entity such as a computing device or a set of computing devices can be provided in different ways. Different ways of configuring access include configuring by using local files on a server (possibly in combination with local clients on the client device), configuration information in directories (e.g., Active Directory, LDAP (Lightweight Directory Access Protocol) directories, NIS (Network Information System) directories), and/or databases. Many forms of configuration can be used simultaneously. Often configuration further relies on configuration data not necessarily perceived as a part of access configuration, such as DNS (Domain Name Service), DHCP (Dynamic Host Configuration Protocol), shared file system configuration, and even configuration of switches and routers in the network.

Regardless of the manner how access is provided access relationships can be formed between various entities of a computer system. An access relationship is understood to refer to a relationship between a source entity and a destination entity such that the access from the source entity to the destination entity is permitted. Access relationships are hence sometimes called trust relationships.

Information on access relationships between entities exists in computer systems. Access relationships can be based on security credentials such as keys used by the entities.

Access relationships can form chains. Such chains of access relations can also be referred to as chains of trust. Such chains of trust may not be intended to exist but may have been created accidentally and independently from each other. The chains can also become long, complicated, have different originators and so on. There may also be chains which have lost their original purpose when changes occur in one of the nodes of the trust chain. This all adds to the difficulty in managing trust relationships in a network system.

SUMMARY OF THE INVENTION

According to an aspect there is provided a method for controlling access relationships between entities in a computerised system, the method comprising determining a first access relationship between a first entity and a second entity, selecting at least one intermediate entity for routing of a second access relationship between the first entity and the second entity via the at least one intermediate entity, and creating the second access relationship, the second access relationship comprising a chain of access relationships via the first entity, the at least one intermediate entity and the second entity.

According to another aspect there is provided an apparatus comprising at least one processor, and at least one memory including computer program code, wherein the at least one memory and the computer program code are configured, with the at least one processor, to cause the apparatus to determine a first access relationship between a first entity and a second entity, select at least one intermediate entity for routing of a second access relationship between the first entity and the second entity via the at least one intermediate entity, and create the second access relationship, the second access relationship comprising a chain of access relationships via the first entity, the at least one intermediate entity and the second entity.

According to an yet further aspect there is provided a non-transitory computer readable media comprising program code for causing a processor to perform instructions for access relationship control in a computerized network, the method performed comprising determining a first access relationship between a first entity and a second entity, selecting at least one intermediate entity for routing of a second access relationship between the first entity and the second entity via the at least one intermediate entity, and creating the second access relationship, the second access relationship comprising a chain of access relationships via the first entity, the at least one intermediate entity and the second entity.

According to a more specific aspect, data between the first entity and the second entity is routed according to the created second access relationship. Information of the first access relationship and the created second access relationship between the first entity and the second entity may be stored in a database of access relationships.

The created second access relationship may be prioritized over the first access relationship.

Switching back to the first access relationship may be caused in response to a predefined event.

Information of the first access relationship may be replaced with information of the created second access relationship in a database of access relationships.

The intermediate entity may be for monitoring and/or auditing data traffic. The intermediate entity may decrypt at least a part of communications between the first entity and the second entity.

It can be determined whether it is possible to replace at least a part of the first access relationship by one or more access relationships associated with the at least one intermediate entity.

The second access relationship may be selectively created taking into account various criteria. The selective creating may comprise taking into account information of at least one of potential consequences of changing access relationships between the first entity and the second entity, data traffic through at least one intermediate node in the path between the first entity and the second entity, policy, rule or setting relating to access relationships, input via a user interface, encryption keys used in association with access relationships, one or more encryption algorithms used in association with access relationships, approver of at least one access relationships associated with communications between the first entity and the second entity, identity of users, hosts, hosts groups and/or other nodes associated with access relationships between the first entity and the second entity, security credentials used for communications between the first entity and the second entity, validity of security credentials used for communications between the first entity and the second entity, number of hops in communications between the first entity and the second entity, whether enumerated nodes are associated with communications between the first entity and the second entity, maximum validity period of access relationships associated with communications between the first entity and the second entity, number of users of a node associated with communications between the first entity and the second entity, number of incoming and/or outgoing access relationships into and out from one or more nodes associated with communications between the first entity and the second entity, sameness of access relationships associated with communications between the first entity and the second entity, source of the originating user identity information, and software products used in nodes associated with in communications between the first entity and the second entity.

The operation may be controlled by an apparatus comprising one of a key manager and an intermediate data capturing apparatus.

Further aspects are disclosed in the detailed description below and the appended dependent claims.

DETAILED DESCRIPTION

Figure 1:
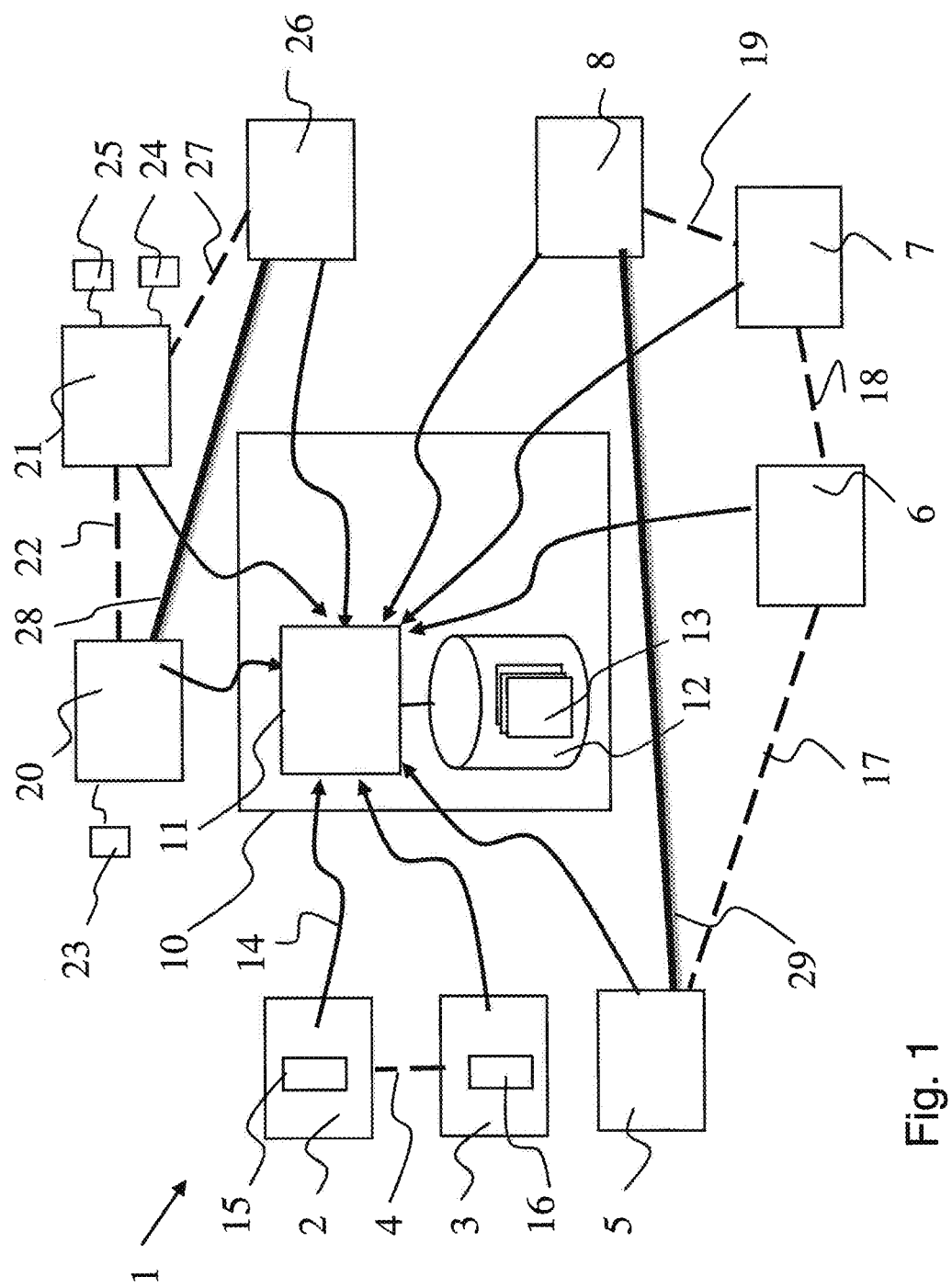
FIG. 1 shows an example of a computer system and access relationships between entities of the system.

In the following certain examples relating to various aspects of access relationships in a computerized system are described with reference to the appended drawings where FIG. 1 shows an example of such a system. The system 1 can be understood comprising data processing entities such as computers, virtual machines, containers, user accounts and/or groups of computers, virtual machines, containers, and other associated components, together with associated software.

A physical computer is typically a data processing unit comprising at least one processor, at least one memory and an operating system. A virtual machines (VM) provide functionality of a physical computer by emulating a computer system. A virtual machine is not necessarily provided by a given physical entity but can be provided in what is known as the "cloud". VM implementations may involve specialized hardware, software, or a combination. Each virtual machine runs a unique operating system. A specific software application runs between the hardware and the operating system for creating and running the VMs. A more recent development is operating system level virtualization. The operating system level virtualization allows resources of a computer to be partitioned via the kernel's support for multiple isolated user space instances. Such virtual instances sharing operating system resources are called containers. A characteristic of containers is that they are fast to start ("open") for the task or application. Containers sit on top of a physical server and its host operating system. Containers can thus be described as simplified virtual machines, a difference being that containers do not have their own operating system. Containers may nevertheless look and feel like real machines to the end users. An advantage of containers is that they are computationally light and quick to start. Pods are groups of containers created or destroyed together, usually belonging to the same logical application.

An entity can have at least one associated user account. User account can comprise information for a particular user which can be a human and/or a machine, or a group of users. A user account can define an identity that is authorized to perform predefined actions. A user account typically be accessed by a given entity or entities. The accessing entity can be a human or a machine. Location of the user account can depend on the type thereof.

In FIG. 1 entities 2 and 3 are shown to comprise user accounts 15 and 16, respectively. Entity 20 is shown to be associated with user account 23 that is not physically comprised within the entity. Entity 21 is shown to be similarly associated with at least two user accounts 24 and 25. A user can be authorized to access a destination entity and log into a user account associated with the destination entity.

An access relationship refers in this disclosure to a relation between a source entity and a destination or target entity where the source entity is permitted to access the destination entity. The permission may be based on appropriate security credentials such as keys, certificates and so on. The permission is based on trust between the parties, and hence the terms access relationship and trust relationship can be used interchangeably in this description.

Information of existing access relationships in an organization would be desirable by the operators of the network systems thereof. For example, an organization or the like needs, or at least may want to have awareness who is able to access data and systems. The operators may also want to be aware of what data and components of the system can be accessed and by whom. Large organizations may have thousands, even in the order of hundreds of thousand servers and other computing devices, and even millions of user accounts. This mean a huge number of access relationships.

An approach to provide information on existing access relationships is to collect information on keys, for example SSH (Secure Shell) keys and the like, associate private keys with corresponding public keys, and visualize the resulting graph on a computer display. The display can be substantially in real-time based on the latest determinations.

Information on access relations can be provided at an appropriate network entity. A possibility is to utilize a network entity functioning as a key manager. A system under management of a key manager may comprise a potentially large number of entities (hosts, users, accounts etc.), and the key managed can provide information based on the information of keys used in the system. Another example of a possible source of information is a network entity configured to provide access control in the system. Such an entity can be configured as a transparent intermediate apparatus capturing access requests between users and hosts accessed by the users. The intermediate entity may be configured to manage security credentials for the access. An intermediate access control entity may maintain maps of access rights that have been created and maintained by the operator and/or may be dynamically maintained. In addition to providing information of access rights in the system, network elements such as a key manager, intermediate access control apparatus or the like, can be configured to provide control on the access relationships based on the information.

The system and the individual entities can change constantly, and hence need constant monitoring. A key manager, access controller or another monitoring entity can be adapted to function such that it brings visibility and manageability to the system by providing a simplified view thereof. Such monitoring entity may also be arranged to actively control access relationships in the system.

In FIG. 1 example one-to-one access relationships between two entities are denoted by the dashed lines 4, 17, 18, 19, 22 and 27. Of these access relationship 4 is between a source entity 2 and a destination entity 3. Access relationship 22 is between a source entity 20 and a destination entity 21.

At the same time an access relationship 27 exists between what is now also a source entity 21 and a destination entity 26. Access relationships 22 and 27 thus denote a situation where there is a pivoting entity 21 between the first source entity 20 and final destination entity 26.

Another example illustrating a situation where the access relationships between two entities are chained is shown between entities 5 and 8. In here entity 5 can access entity 7, thereby forming a first access relationship 17. Entity 6 in turn can access entity 7, forming a second access relationship 18. Entity 7 can access entity 8, forming a third access relationship 19. Thus a further chain of access relationships comprising relationships 17, 18 and 19 between entities 5 and 8 exists in system 1.

An access relationship can be associated with a source entity (e.g., user account, group, and/or host) and destination entity (e.g., user account, group, or host) to which login from the source entity is permitted. Access relationship data may include, in addition to identity of the entities, various types of other information, such as relevant source and destination configuration information (e.g., identity key and authorized_keys file entry, Kerberos keytab file entry, or host-based authentication configuration entry, authorized principal name), source restriction, command restriction, certificate, trust anchor (e.g., certificate authority), and/or identification of a key pair used for configuring the access relationship (e.g., one or more fingerprints for the key pair).

FIG. 1 shows a data processing apparatus 10 adapted for managing and/or acting on relationship information. A plurality of entities 2, 3, 5, 6, 7, 8, 15, 16, 20, 21, 23, 24, 25, and 26 that can form access relationships between each other in the system are also shown. It is noted that at least some of the entities can comprises a virtual machine or a container. The data processing entities can be connected, either directly or indirectly, to the data processing apparatus 10 for the purposes of access relationship management. It is noted that the number of data processing entities in the system can be considerably greater than what is shown in FIG. 1.

The data processing apparatus is shown to comprise at least one processor 11 and at least one memory 12. The memory can be arranged to store records or files 13. The data processing apparatus 10 is configured to provide management operations such as information collection, information analysis, information correlation, access relation discovery, storing of access relationship information, using access relationship information in controlling access relationships between entities, displaying access relationship information, actively managing access relationships, monitoring for and controlling access relationship chains, creating new access relationships based on information of detected access relationships and/or replacing existing access relationships with new access relationships and so on.

In some specific examples at least a part of the access relationship and access right management and related operations may be provided by an apparatus configured to operate as an access controller or a key manager. In this description the term "key manager" refers to a system for managing automated access without being restricted to managing of keys. However, these are not the only possibilities and other network entities can also be used for providing the herein disclosed access relationship and access right management operations.

According to an aspect access relationship information is computed and stored in the system 1 based on configuration information. Apparatus 10 can be configured to collect access-related configuration information from the plurality of entities and determine access relationships between the entities based on the configuration information. In FIG. 1 the information collection is illustrated by single headed arrows 14. Access-related configuration information can be collected from the plurality of entities, including all entities or a parts of entities connected to data processing apparatus 10. For example, it is possible to collect the information from thousands of hosts and for thousands or even millions of user accounts and/or users. The collected information is analyzed by the processor 11 and correlated to identify access relationships between different entities.

The determined access relationships can be stored in a non-volatile storage 12. This is advantageous for various reasons. For example, there is no need to re-compute the information if there is a need to boot the apparatus for whatever reason. Also, because the access relationship data is permanently stored it can be used in analysis of the system, for example in comparisons for determining changes in dynamic environment. The stored information about the determined access relationship can identify the source entity and destination entity.

Chained access relationships can become complex and problematic to manage. Conventionally access relationships are managed as a single one-to-one relationship between two entities. Granting an access relation to a particular host where the user already has other access relations, or is able to use existing access relations, can result a situation where a single grant of access relations enables multiple accesses. A large system can include a huge number of chained access relationships based on a large number of security credentials. Some of the chains may not even be intended to exist but may have been created accidentally. The chains can be created and exist independently from each other. Thus unintended accesses to resources in a system may have been granted through one or more chains of access relationships. There may also be chains which have lost their original purpose when changes occur in one of the nodes of the trust chain. Legacy unmanaged access relationships can result at least some unmanaged relationships in a chain. These can be detected by scanning the system but just deleting such parts of the trust chain may lead to non-predictable failures. A change in entity's rights of access (e.g. due to change of organization, end of project, etc) is not percolated to all elements of the trust chain. Some segments in a chain might also be such that their traffic should, or must be observed by an operator, administrator or the like. In some cases it might be useful to observe the traffic in order to make a decision whether a chain of access relationships should be terminated. It may also be desired to be able to determine if a determined chain of access relationships can be terminated. For example, it may need to be determined whether removal of a chain of access relationships causes undesirable consequences. At least some elements of a chain of access relationships cannot be blindly deleted as there may be legitimate reasons for keeping them.

According to an aspect management and/or use of information regarding access relationships as well as the access relationships themselves can be simplified by operation where chained access relationships are monitored for and detected. In response detecting a chain of transitive access relationships a direct access relationship is created.

Figure 2:
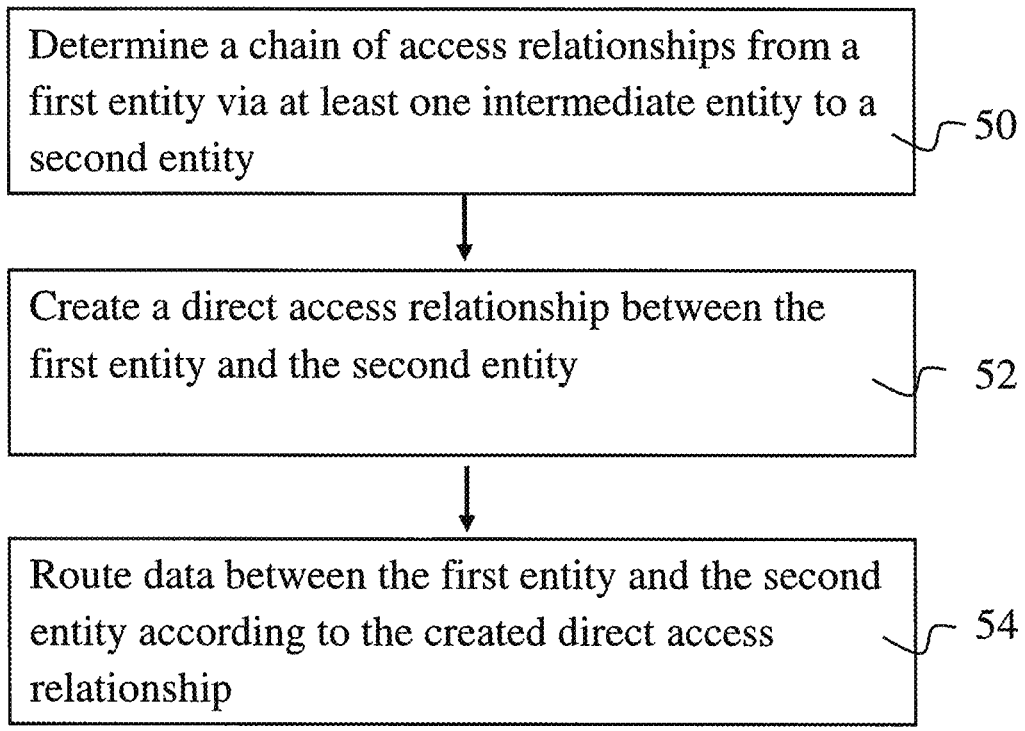
FIGS. 2 and 3 shows flowcharts of certain examples.

FIG. 2 shows a flowchart according to this aspect. In the shown method control of access relationships between entities in a computerised system comprises determining at 50 a chain of access relationships from a first entity via at least one intermediate entity to a second entity. At least one direct access relationship between the first entity and the second entity is then created at 52 based on the determined chain of access relationships.

Data between the first entity and the second entity can then be routed according to the created at least one direct access relationship. This is denoted by block 54 in FIG. 2. Alternatively, or in addition, a graphical presentation comprising the created at least one direct access relationship can be generated and displayed.

Information of the created direct access relationship between the first entity and the second entity can be stored in a database of access relationships. Storing of information of the detected access relationships between the first entity, the at least one intermediate entity and the second entity can be continued after the creation of the direct access relationship. For example, this information can be maintained until it is considered that is will no longer be needed. Information of the chain of transitive access relationships may be replaced in the database by the information of the at least one created direct access relationship. This can be done immediately, after a certain period of time, or in response to a specific event.

In accordance with another aspect a direct access relationship is replaced by chained access relationships. This may be desired e.g. when a segment of the chain needs to be treated differently from the other segments, data traffic based on the access relationship require special attention, is subject to special conditions, and/or needs to be audited, and so forth. An example of this is where an operator wishes to route traffic associated with an access relationship through a given node, e.g. as an auditing node, a usage monitoring node or the like. This enables further analysis, e.g. data audit of the traffic, in a node added between the original entities by splitting the direct access relationship between the entities into chained access relationships.

Figure 3:
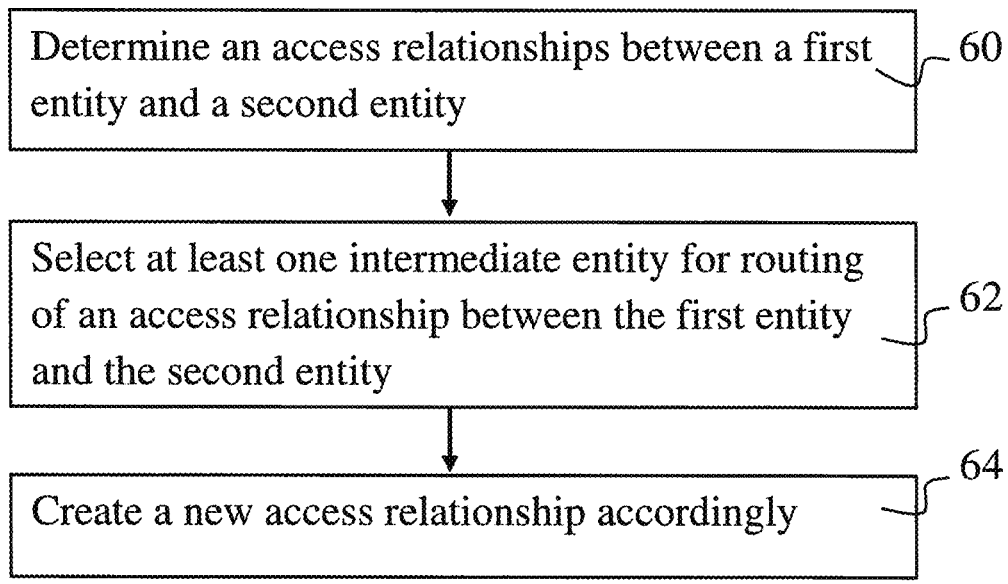

FIG. 3 shows a flowchart according to this aspect. The shown method for controlling access relationships between entities in a computerised system comprises determining at 60 that there is a direct, or first, access relationships between a first entity and a second entity. At 62 at least one intermediate entity is selected for routing of a second access relationship between the first entity and the second entity via the intermediate entity. The second access relationship is then created at 64. The second access relationship comprises a chains of access relationships via the first entity, the intermediate entity and the second entity.

In this context the term "routing" or access routing can be understood to refer to transitive access relationships that enable gradual chaining of logins to form a connection between nodes. In response to determining that there is a possibility to use the second access relationship an appropriate control action can be taken. For example, the direct or first access relationship can be replaced with at least two access relationships between the first entity, the intermediate entity, and the second entity based on the determined chain of access relationships. An administrator may be notified of the possibility of such change, and/or prompted to make a decision whether the replacement should be performed.

According to a possibility the created new, chained access relationship via the intermediate entity is given priority on the old access relationship. In response to a predefined event such as a communications failure the old, now secondary access relationship is taken into use.

A direct access relationship replacing chained access relationships and chained access relationships replacing a direct access relationship may be created selectively e.g. based on a policy, a rule or administrator input. For example, a new direct access relationship may be created only if it is first determined that the chained relationship is in principle acceptable based on a criteria or policy. According to an aspect replacing an existing transitive access relationship chain with a corresponding direct access relationship can be conditional to receiving an acceptance from an administrator to an offer to complete the replacement action.

An old chained access relationship may be replaced in access relationship database with the created new direct relationship. According to a possibility the database maintains information of both the old chained relationships and the created direct access relationships. A display may be generated where the created new direct relationship is shown instead of the chain of relationships on the path between the source and target nodes. It is also possible to show a relationship display comprising all possible relationships.

The data of the old chained access relationships may also be used in determining whether an access relationship is a direct access replacing a chained access relationship. The old stored data of chained relationships can be used in the transverse operation of segmenting the direct access relationship back into a chain of access relationships.

A control operation may be performed on a determined chain of access relationships and/or a determined direct access relationship. A determined chain of access relationships, or one or more parts thereof, may be selectively allowed or rejected. According to a possibility the chained access relationship is marked as forbidden. For example, a chained access relationship (e.g. A-B-C-D) may be violating an existing policy. A check can be made if a chained access relationship or part of it violates one or more policies and if it either needs to be removed or a non-violating alternative needs to be provided. For example, in the chains A-B-C-D nodes B, C may belong to a test host group, whereas nodes A and D may belong to a production host group. Such a chain can violate a separation of concerns policy. In such case it is possible to safely replace the chain with a single direct relationship A-D. A chained access relationship may also have been marked undesirable by an administrator. This enables a manual control in addition to the automatic control based on a policy violation mechanism.

According to a more specific example a network apparatus 10 detects a chain of trust, i.e. a transitive closure of access relations for a particular entity. The apparatus may in parallel detect the chains for a multiple of entities. At one extreme, all possible trust chains in the system are determined.

The apparatus may then create an offer to replace chains of trust by a logical single access relationship. The offer may be presented to an administrator, or sent to another network entity configured to automatically control access right in the system. An offer to replace a direct access relationship with a chain of access relationships may also be generated and processed.

According to a possibility a created new single local access relationship can be routed via a dedicated intermediate node producing an access relationship to this node and another from the node to a logical target. From the logical source point of view this appears as a single connection.

Creation of direct access relationships enables changing the network topology towards a logical star topology. Each relationship can be managed as a single logical item, with (potentially) single ownership and single responsibility. In general, creation of direct relationships may simplify management of access rights and keys by removing non-direct trust relationships which are more difficult to manage.

The single relationship record can include necessary (meta)information from the nodes of the trust chain.

Collected access relationship information can be stored in a database. An access relationship information record can be e.g. of form:

Access relationship=source entity, target entity.

The components can e.g. define a user account at source entity and user account at the target entity. Additional metadata may be associated with the access relationship (e.g. cryptographical algorithm, the approver of the relationship, etc.). A single access relationship can be identified by a fingerprint or an internal identifier.

A "transitive closure" of one or more access relationships may then be computed/explored. Transitive closure of access relationships is a relation that expresses all of the target entities that can be reached from a source entity by repeatedly traversing access relationships. A complete transitive closure represents a full access graph of the system under management; however this graph is implicit in the set of access relations. A transitive closure in a graph can be computed by traversing that graph and keeping track for each node N of those nodes that can be reached from node N by traversing the graph. Depending on the use case extra information can be tracked, e.g. the path or paths traversed in the graph leading to particular node; here information of the path contains at least identities of the nodes, but also information on the arcs of the graph between the nodes may be considered.

In this context Implicit requires computing the closure induced by the graph. For each element in a transitive closure, it is possible to maintain information of the sequence of transition relations that was used to reach the target entity or element. It may be that there are multiple paths that are used to reach the same target element.

It is possible to generate, maintain and update information for all determined relationships. All information may be computed every time a new event associated with a relationship is detected. According to a possibility a partial/approximate representation is generated only for a single or limited number of starting points. Events may be computed only up to a certain length of the chain. Similarly, for storing information for a closure may be limited to a certain length as some of the chains may be relatively long.

Certain examples will now be described with reference to FIGS. 4 and 5.

Figure 4:
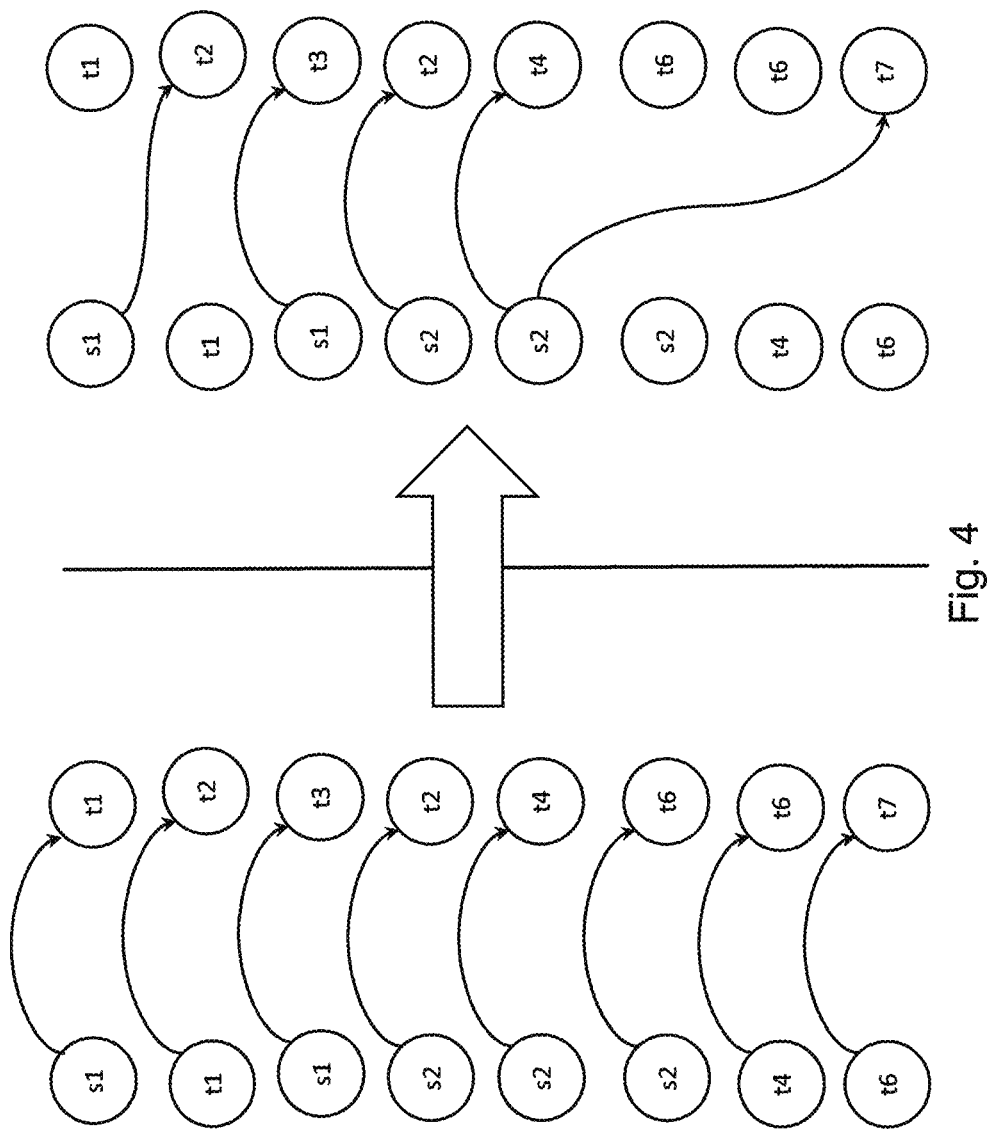
FIGS. 4 and 5 show schematic examples of changes from one-to-one structures to chained structures.

For example, in FIG. 4 for a given single relation R1 (R1 (s1, t1)) where s1 represents the source and t1 represent the target another associated relation (R2 (t1,t2)) has been found on the left. In relation R2 the source element t1 is the same as the target element of R1. The "transitive closure" for relations R1 and R2 starting from R1 is determined to contain relations (t1,t1), (t1,t2). This relation expresses target elements that can be accessed from element t1 by traversing one or more access relationships. On the right this chains has been replaced by a direct path from s1 to t2. Node t1 has been dropped from the communications path.

More particularly, left hand side shows a set of access relations, e.g. s1-t1, s1-t3, t1-t2, s2s-t2, s2s-t4, s2-t6, t4-t6 and t6-t7. These can be represented as a graph given in the left hand side. It is possible to compute the transitive closures (TC) induced by this graph. Starting from node s1 it is possible to reach node t3 and node t1 by making a single step in the graph. The TC for s1 is now a list for nodes [t3,t1]. When continuing building of the TC it is noted that there is no more steps from t3 but that it is possible to reach t2 from t1. So TC is now [t3,t1,t2]. As there is no more outgoing arcs from t2 a final TC for node s1 has been determined.

It is also possible to keep track of the paths taken in the graph to construct the TC. The paths may be denoted by names of the nodes but they can also include information of the arcs (e.g. fingerprints or other info). The paths used in the example are the 1-step paths [t1] and [t3] and the 2-step path [t1,t2].

More information than the above can be stored and maintained. E.g. the path leading to the target (s1,t1,[R1]), (s1,t2,[R1,R2]) can be determined and stored.

Figure 5:
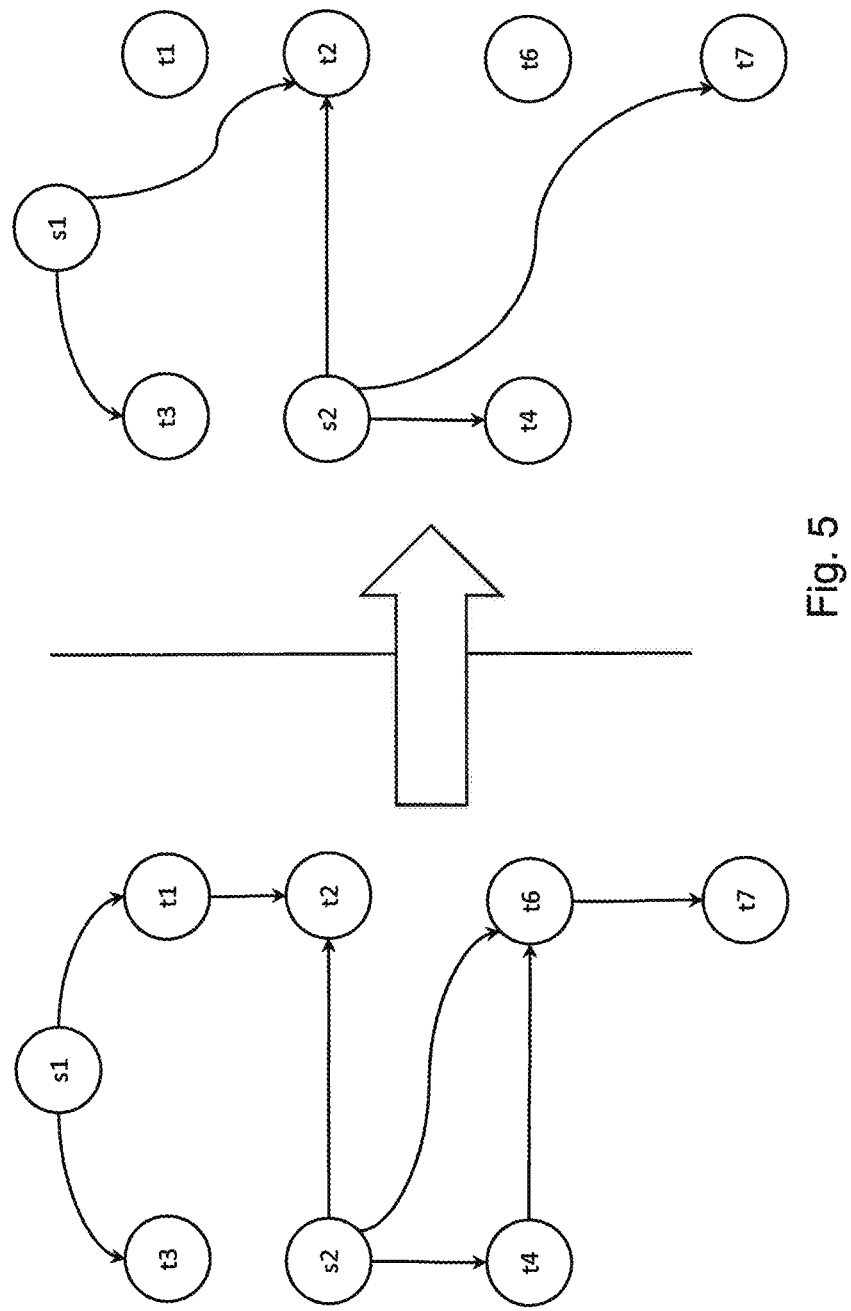

FIG. 5 shows an example, more particularly transition from a tree like structure on the left to a star like structure on the right. On the left is the starting point showing a number of closures. Two of them are s1: [t1,t2,t3] and s2: [t4,t6,t7]. These closures can be seen to have paths s1: [[t1],[t1,t2],[t3]] and s2: [[t2],[t4],[t4,t6],[t4,t6,t7],[t6,t7]]. Thus s2 has two paths leading to t7, namely [t4,t6,t7] and [t6,t7]. A possible decision would be to replace both paths by a single relation s2-t7. However, a criteria/policy may stipulate that relation s2-t4 needs to be kept, and hence this may not be not be deleted. The accesses through t6 were deemed unnecessary and hence deleted in this example.

Figure 6:
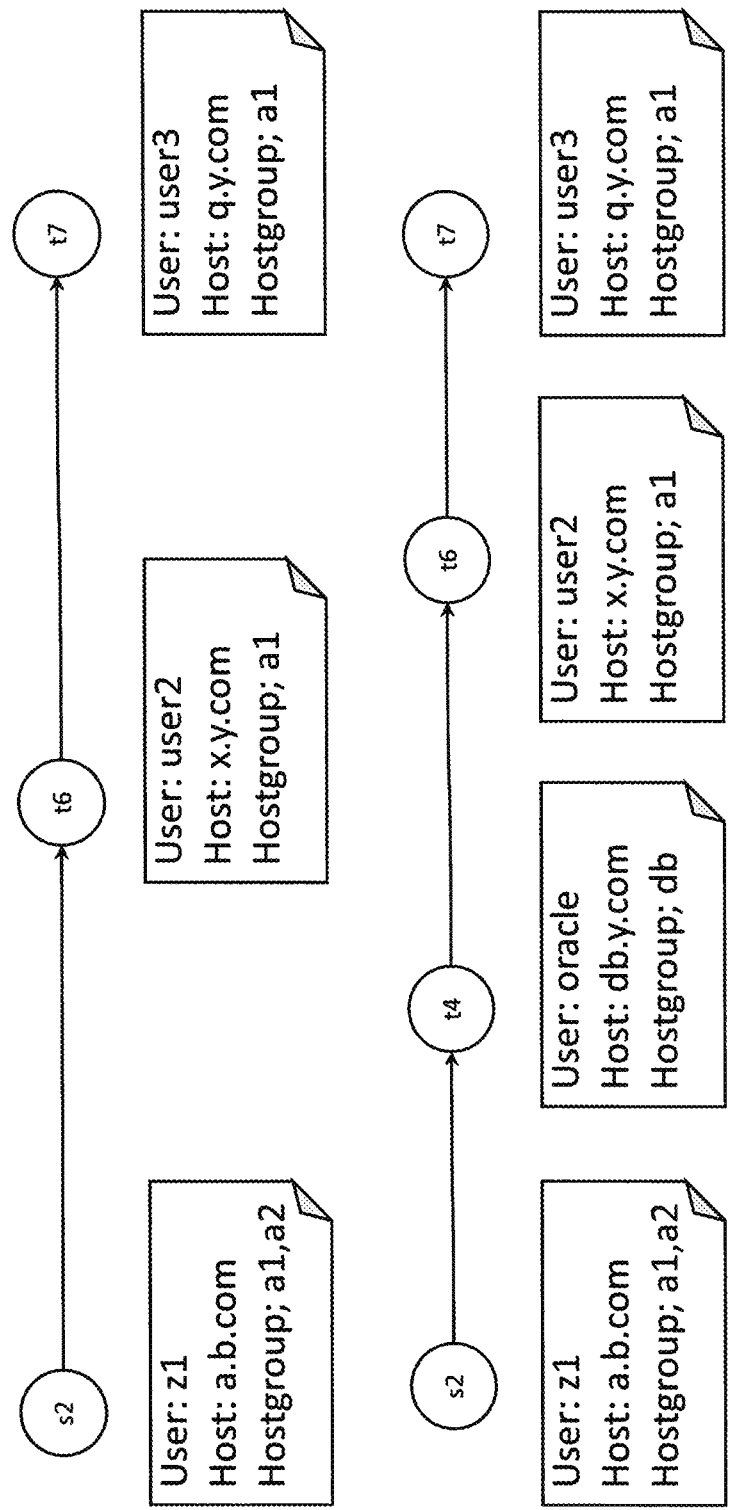
FIGS. 6, 7 and 8 show examples of application of predefined criteria in determining direct chains of access relationships.
Figure 7:
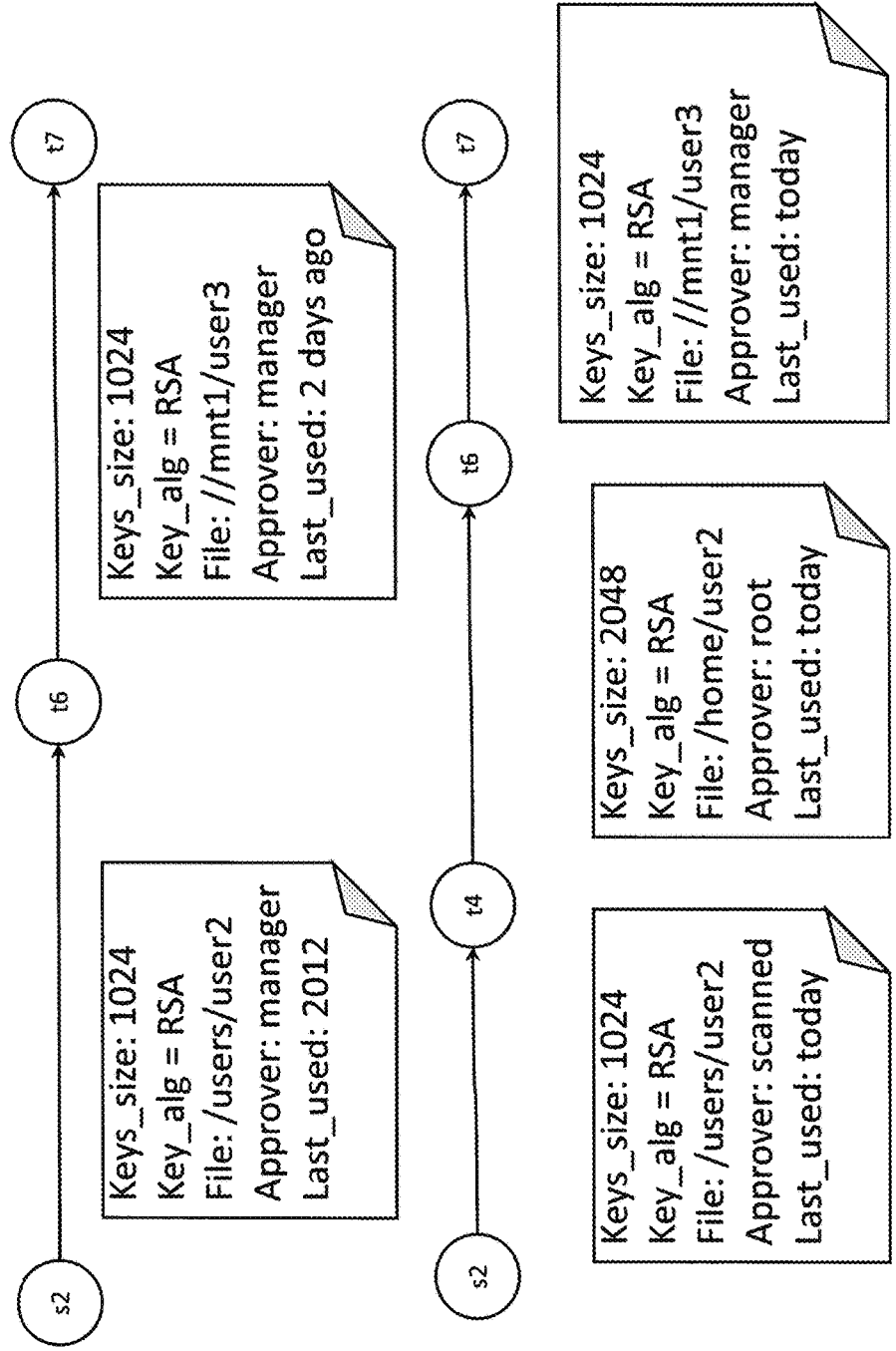
Figure 8:
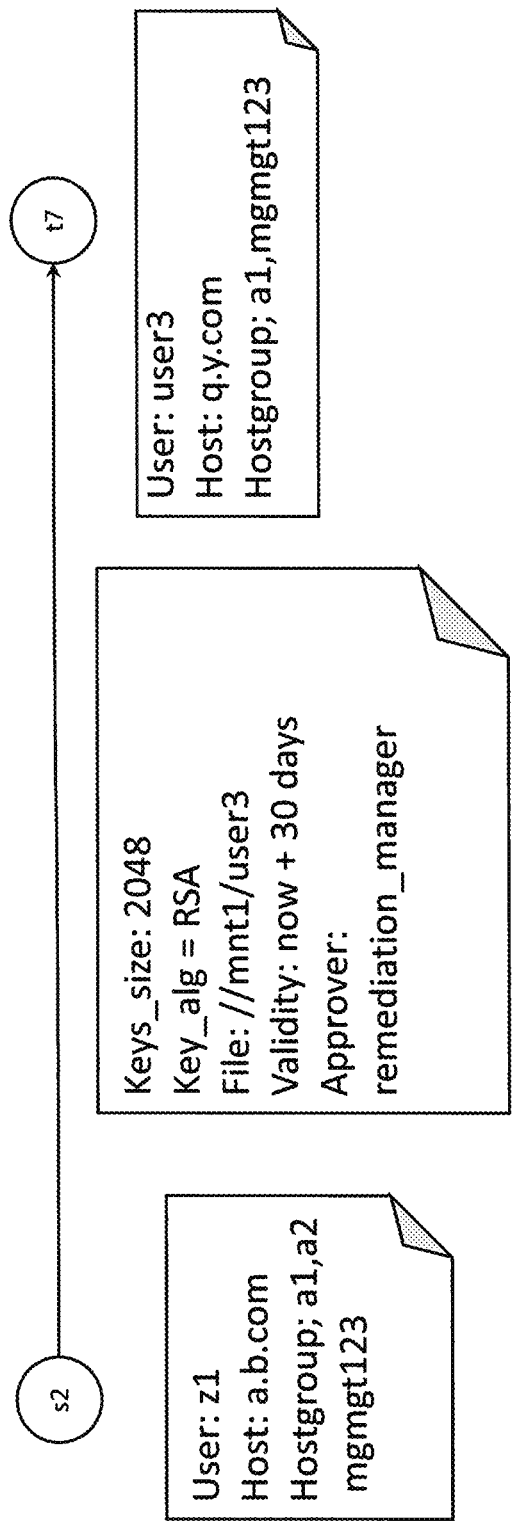

FIGS. 6, 7 and 8 exemplify use of various criteria in determining a direct access relationship between s2 and s7. Candidates for an access relationship structure may be selected from a transitive closure. Various criteria can be used in the selection of the relationships representative of the closure.

In FIG. 6 paths from s2 to s7 and node properties on the paths are considered. The properties can include information such as user names or IDs, host names or IDs, host groups and so on. FIG. 7 then exemplifies considerations in view of the determined paths from s2 to s7 and relation properties. These properties can include information on key sizes, key algorithms, file locations, approvers, usage and so on. FIG. 8 then shows the created new direct access relationship and certain properties thereof. Certain examples for the criteria are described in more detail below. These criteria can be used as inclusive and exclusive criteria. Some of the selection parameters can be designed such that too large closures can be avoided.

According to a possibility the number of hops is taken into account in the computations. For example, a chain longer than N hops will automatically be proposed to be replaced.

Chain paths going through enumerated hosts or alternatively chain paths not going through enumerated hosts can be selected for replacement by a direct access relationship path.

Maximum age of access relationships in a trust chain can also be taken into account. Other examples of possible criteria include information on approvers of individual trust relations, number of users on a given host in the trust chain and/or number of incoming and/or outgoing access relations in the trust chain. The number of access relations can be determined for as a total number and/or as a number for a single node. Key usage activity of individual nodes and/or overall key usage activity can also be taken into account. This can have a minimum and/or maximum thresholds.

It is also possible to consider, based e.g. on detection or interpretation, that different paths are substantially the "same". In the case of determined "sameness", the relevant paths can be replaced by one path. Sameness or similarity of paths can be determined based on various factors. For example, all paths leading from a source entity to a target entity can be considered to be ones that can be represented by a single access relationship. Sameness can also be determined based on use of same username for all source and target entities (differences can be e.g. in key fingerprints, key sizes, etc.). Sameness can also be determined based on users on paths belonging to the same "application". Sameness based on hosts in paths belonging to the same host group. Sameness of users based on comparing to an external authentication server (e.g. active directory, shared or directory accounts). Sameness based on the source of the related keyfiles, e.g. network file system (NFS) or other shared sources. Sameness of key options may also be taken into account.

For example, possibility of using x11 can be considered (x11 is one possible SSH authorized key option). According to an example user1 on host1 has an authorized_keys file a fingerprint fp1 without options. It can be that user2 on host2 has the same fingerprint fp1 in authorized_keys, but a key option, e.g. -x11, is available. It is up to determination, e.g. based on a policy or administrator input whether these two keys are "the same". It could be 'yes' by default but different allow-from and deny-from options might be determined so that keys are different.

Selective creation or modification of access relationships can also be based on the source of the original user identity. Selective operation may also be based on knowledge of the location of the private key and/or based on the physical location of the key files. The location can be e.g. local directories, shared directories, NFS, etc. These examples pertain to the possible criteria of choosing trust relationships to be removed or included. For example, it can be recognised that having an externally managed system for managing user identities is generally safer than e.g. relying on users on a host. Likewise, having a keyfile on a locally managed machine can be considered less secure than having a keyfile in a centrally managed shared directory. Also a centrally managed identity or shared directory can mean that essentially the same trust relation might be visible in multiple locations (hosts, files) so removing can be an expensive operation. Such removal may also affect other chains of trust relationships.

The products used (e.g. OpenSSH™, TectiaSSH™ etc.) can be taken into account. Determined users in the path may also be considered. E.g. information about root trusts or known application trusts, users like root, oracle, www, guest, etc. can be taken into account.

The closure can be used to derive constraints, requirements or parameters for the new access relationship to be generated. For example, minimum/maximum values for various parameters can be defined. Examples of the parameters that can be set include validity time and/or key size of the access relations in the chain. Any necessary approvals may be collected from the detected access relationship chain. Key options in the trust chain may also be taken into account. It can also be defined that hosts in a created new access relationship shall both belong to a same host group derived from host groups on the path. This may trigger new group host creation and adding of hosts to that. It is also possible to define that hosts in the new access relationship shall both belong to same application derived from an application on the path. It can also be defined that private keys can only be generated to a given location.

Software product or products used in association with the path may need to be determined based on information about the path. The product in here refers to a possible software implementations (e.g. a Tectia or Openssh products). A part of the metainformation associated with the chain is the format of the key which in turn this corresponds to the product. It may be desired to be able to deduce from the path the used/necessary product features so that when producing a replacement relationship the path has the same necessary features. This can be used to generate a single new trust relationship that is still compatible of the given product or products.

According to an aspect one or more segments of the trust chain are selected to be replaced with a logical single connection. This is different from selecting a single direct relationship in that the new relationship can be a chain of replacement relationships.

A set of constraints that are to be observed in the logical connection for the segment from the closure can be as above. A set of properties for the connection that are to be enforced by an intermediate entity.

It is also possible to arrange a number of logical connections to go via an intermediate node. For example, multiple logical connections may be routed via an intermediate node that pipes the connection from the logical source(s) to the logical target(s).

The system can be provided with an auditing arrangement. The auditing arrangement can be arranged to intercept and/or decrypt encrypted communications. More particularly, data between the entities may flow through an intermediate data processing device that hosts a data capturing entity configured to monitor traffic going there through and capture and forward data to another entity. Thus data communicated between the source entity and the target entity can be captured by the intermediate data processing device.

At least a part of data flowing through the intermediate entity may be encrypted. In such case the intermediate data processing device can be configured to provide a man-in-the-middle (MITM) type operation on encrypted data flowing there through to obtain the plaintext of the data. The MITM operation involves decryption of encrypted data. This would typically be based on knowledge of the private key used in the encryption. The data capturing intermediate device can be operated and maintained by a trusted patty, typically the owner of the network, and can thus be provided with the necessary keys and/or other security information required for the decryption. It is noted that this is only an example and that the shown architecture and/or MITM type operation is not necessary in all scenarios. For example, the monitored passing data flow can also be plaintext, for example plaintext TCP communications. Instead of the shown arrangement other network arrangements and modes are also possible. For example, interfaces can be in a bastion mode.

In accordance with an embodiment substantially all data of a session captured by entity can be sent to a separate server. In accordance with other embodiments it is sufficient if only some of the captured data is sent. In some embodiments sending may be selective, and thus only e.g. information about which files are accessed through the session may be sent without sending the actual file contents. For example, a signature-based IDS or DLP system can be provided even if the system only receives samples of the traffic. On the other hand, systems performing deep analysis may expect to receive most if not all data of a given channel.

The intermediate data processing entity can be further connected to a separate processing device in the network. The separate device is configured for analysis and/or other processing of the data captured by the intermediate entity. In accordance with a particular example the receiving device provides an Intrusion Detection System (IDS). The link can be provided based on various protocols. In accordance with an example described below a synthetic TCP/IP based connection is provided.

Both the generated single trust relation can be maintained until the corresponding trust chain can be depreciated. For example, for a chain A-B-C-D and a generated new trust relation A-D, traffic in A-B-C-D is monitored until it is considered to be safe to ditch A-B-C-D and only retain A-D. Normal operations might cause removal of individual trust relations either in the chain or the generated A-D. It is possible to observe the traffic going through the intermediate node. This can be used to ensure that the new logical connection is used according to the policy associated with it as auditor arrangement allows observing encrypted communication. This can also be used to enforce the use of connections, e.g. only allow connection during specified time windows. It can also be determined if the new connection/relationship is used at all.

Figure 9:
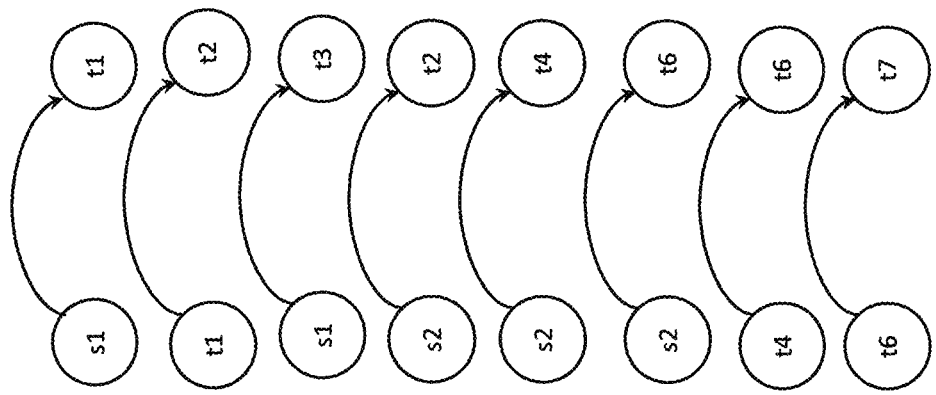
FIGS. 9 and 10 show schematic examples of changes from chained structures to one-to-one structures.
Figure 9:
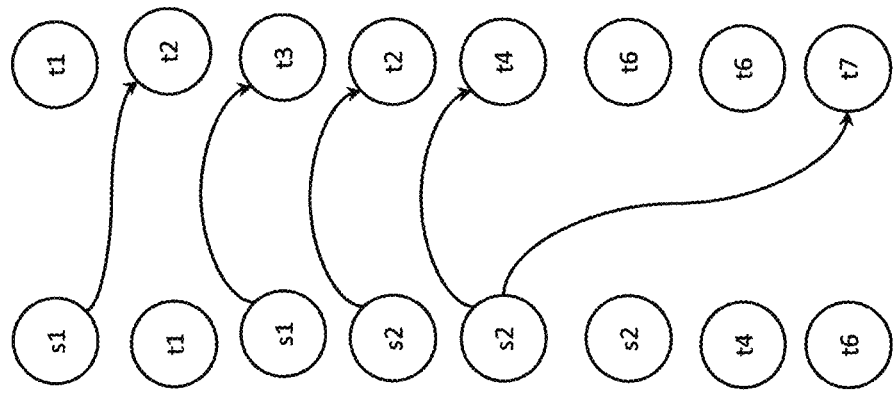
Figure 10:
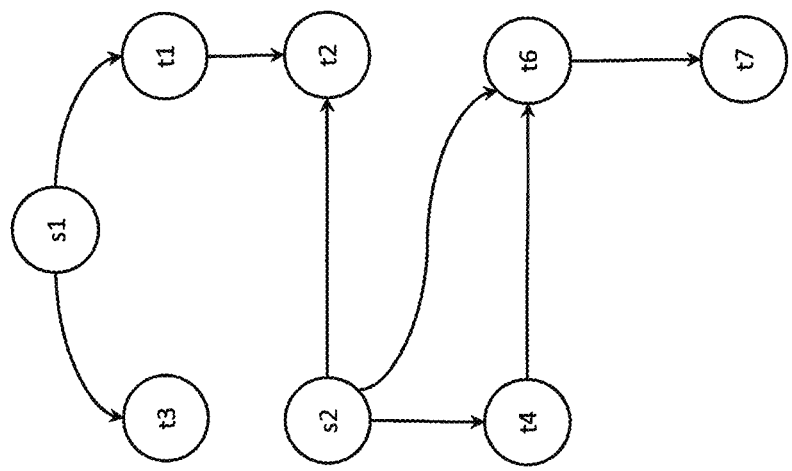
Figure 10:
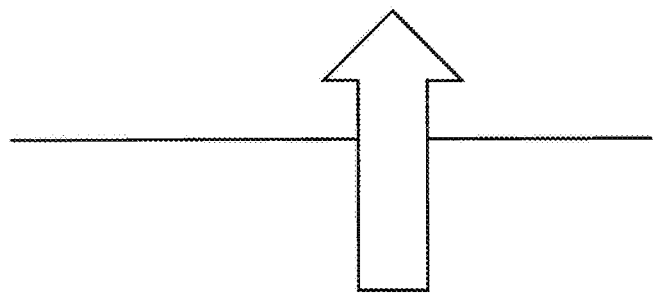
Figure 10:
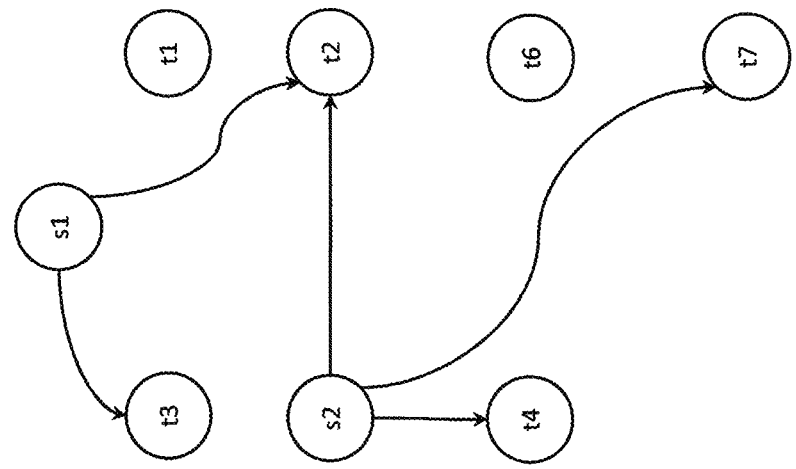

FIGS. 9 and 10 illustrate a reverse operation where a direct access relationship is replaced by a chained access relationship. A direct access relationship can be replaced with a chained one e.g. to route all the traffic via a certain host or hosts. For example, there may be a need to route traffic via an auditing node, for example a man-in-the middle type auditor node. Another possible exemplifying scenario is where it is detected that at least a part of the path such that it needs separate control actions such as monitoring or authorising. It can be detected that there exist at least one generated direct access relationships between a first and a second device. A routed transitive access relationship between the first and the second device is then determined, whereby the transitive trust relationship comprises a trust relationship between the first device and a third device, and a trust relationship between the third device and the second device. There may be further devices in the route. The at least one direct trust relationship can then be with the transitive access relationship.

FIGS. 9 and 10 illustrate simple examples where the changes from chained one-to-one relationships to direct relationships are simply reversed back to the original form. However, this is only one example and more complex operations can be provided.

A reason for introducing an extra node, and related access relationships between two nodes is to be able to observe and control traffic between the nodes. The criteria for selectively introducing an extra node can be similar as discussed above, and be based e.g. on information and metainformation of the nodes.

It may be, for example a policy to observe and record all communication on an access relation that targets root or administrator accounts on a certain host. A target may be replacement of a chain of access relationships A-B-C-D with a direct A-D, i.e. to eventually remove the A-B-C-D chain, but before doing this it may need to be ensured that nothing is removed which might cause a failure. A new observer node may be introduced to each access relationship A-B, B-C, and C-D to see what kind of traffic is being handled in these links. This can be used as decision aid/justification to enable removing some/all of the old access relationships. Based on metainformation of nodes A,B,C,D and the individual access relationships the observer may be placed also in a subset of individual access relationships in the chain access relationships.

Figure 11:
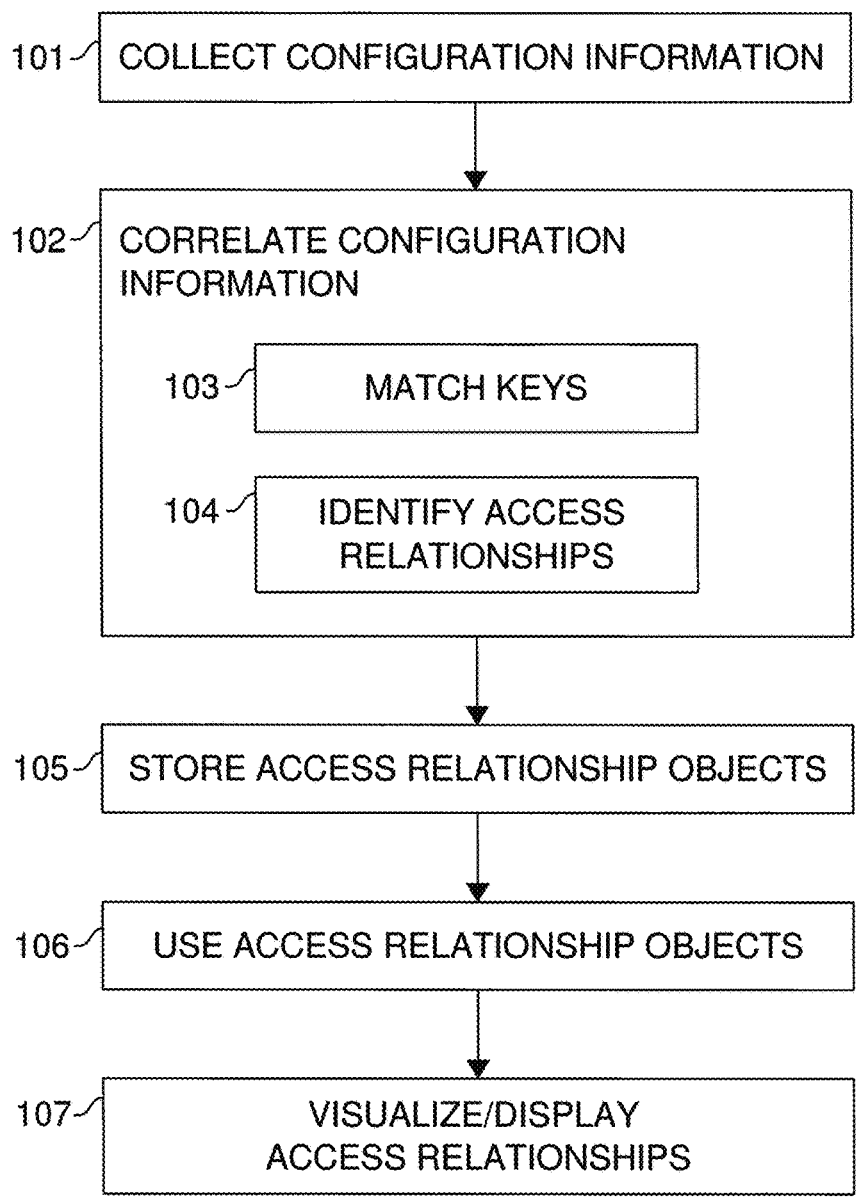
FIGS. 11 to 19 illustrate collecting, analyzing, correlating, storing, using, and displaying access-related configuration information.

FIG. 11 illustrates an example of a method for collecting, analyzing, correlating, storing, using, and displaying access relationship information. Information can be collected from a large number of hosts and/or directories in a computing environment. Step 101 illustrates collecting configuration information from hosts, file systems, directories, and/or other sources. It could, for example, fetch SSH authorized-_keys files, SSH configuration files, and SSH identity key files, or other type of security authenticators such as certification information. The collection could be performed, e.g., using an agent program running on one or more hosts, using a data collection script that is executed on one or more hosts, or using an SSH connection to execute commands on a host. Information could also be collected by reading directories (e.g., using the LDAP protocol (Lightweight Directory Access Protocol)). For example, authorized keys may be stored in a directory and collected from the directory using the LDAP protocol. Information may be collected on a continuous or period basis, and later steps may be rerun and stored values updated in response to changes in the collected information.

102 illustrates analyzing and correlating the collected configuration information to interpret how various authentication mechanisms, automatic access credentials, automatic access authorizations, and other relevant system properties are configured. The properties can be such as directories, filters for information coming from directories such as specification of a base distinguished name, or limitations on which hosts in a domain a user account is to exist. It is noted that a domain in this context may mean a Kerberos or Active Directory domain. The analysis step may also comprise parsing of information received from a host and processing log data. The analysis results may also influence data collection, such as collecting information from directories configured in a configuration file.

The analyzing can comprise stage 103 for correlating various pieces of collected information to stage 104 where it is identified what access relationships exist within the computing environment. It is also possible to identify these across the boundaries of the environment to/from external hosts. Correlating may also compare new information against earlier information to more accurately determine how access relationships and related information have changed. The correlating may, e.g., compare fingerprints or public keys of configured authorized keys to fingerprints or public keys of configured identity keys to identify that an access relationship may exist from the entity for which the identity key to the entity for which the authorized key is configured.

Generally, an access relationship authorizes a source entity to access another entity, for example in the form of logging into the other entity. Once logged in, the access may be used for, e.g., transferring files between the source entity and the destination entity, executing commands on the destination entity, changing the configuration of the destination entity, or interacting with a program running on the destination entity. Access may be restricted in what operations may be performed using the access. Such restrictions may also be identified by analyzing the collected configuration information. For example, the options configured for an authorized key, such as the "from" and "command" options can be looked at.

For example, an access relationship using SSH keys may be configured using an identity key on the client, an authorized key or an entry or line in an authorized keys file on the server (both referring to the same key pair), and more indirectly by an SSH client configuration file on the client (specifying which identity key files to use) and the SSH server configuration file on the server (specifying where to look for authorized keys files). It may also be partly configured in directories, such as in LDAP directory when authorized keys are stored in LDAP, or certificates when the access relationship is configured using certificates and/or principal names.

For Kerberos-based access relationships, the credential may be, e.g., the actual password from a keytab file, or a principal name that can be used for fetching the desired password from a keytab file.

For access relations based on host-based authentication, configuration information for the access relations is typically a line in a file called ".shosts", ".rhosts", "shosts.equiv", "hosts.equiv". The credential may then be considered to be, e.g., the client-side user name on the client-side host (e.g., "user1@host1").

It is noted that in this specification terms credential and authenticator are used interchangeably.

When a source or destination identifies a group, an access relationship may be stored as referencing an object representing the group, or alternatively, as referencing each of the members of the group, or as multiple access relationships, one for each member of the group. Combinations of the approaches are also possible. Generally, the group may be expanded either during the correlating/storing operations, or when access relationships are used and displayed. Expanding a group may involve, e.g., an SQL query to find group members from a database, or one or more LDAP queries to a directory to determine its members.

Storing of information about access relationships takes place at 105. At least part of the stored information may result from the correlating. The information may be stored in a database, such as PostgreSQL, Oracle, or MS SQL Server. Non-relational databases and files may also be used. The information is advantageously stored in non-volatile storage for future reference. Stored information about access relationships may be in the form of database records referencing a source entity, a destination entity, a credential, and potentially other information (such as configuration data elements used for configuring the access relationship). The referenced entities may be stored as, e.g., object identifiers, links, data structures within the access relationship entity, or as separate objects that reference the access relationship entity (i.e., the reference could be in the reverse direction). Source and destination entities may be, e.g., users, hosts, or groups of users or hosts.

Stored information may also comprise configuration entities, such as authorized keys from an authorized keys file on a host, identity keys, .rhosts files, or keytab file entries. The credential may identify, e.g., a key pair. A key pair may be identified, e.g., by one or more of its fingerprints, by its public key, or by a reference to an object identifying a key pair in a database. The credential may also identify a certificate containing a principal name or a certificate specifying a trust anchor (trusted certificate authority). Generally, the credential is some configuration entity that makes authentication of the source entity to the destination entity possible.

The stored information may also identify a date when the access relationship was identified or an object representing it created in a database. The stored information may further comprise information indicating a date after which the access relationship was no longer valid, and/or a status indication of whether the access relationship is valid and/or shadowed by an earlier authorized key for the same public key.

The stored information may also comprise information about restrictions configured for access, such as a source restriction ("from" restriction) or a command restriction. An example of this are restrictions represented by authorized key options in OpenSSH™.

When a change in collected information is detected, an access relationship that is no longer valid may be deleted from the database or it may be modified to identify a date at which the access relationship ceased to be configured. The replacement may be caused by creation of a direct access relationship, or vice versa. There may be a delay in the replacement, for example to ensure that the old information can indeed be safely deleted, to maintain the possibility of reversing the change top direct relationship and so on.

106 illustrates certain examples of use of the stored information. The use may comprise, e.g., querying access relationships, determining access relationships to/from a user account, determining access relationships to/from a host, managing access relationships, auditing access relationships, generating reports and alerts, and visualizing the graph formed by all, or a part of the determined access relationships.

107 illustrates displaying access relationships. The display may take the form of visualizing a graph formed by the access relationships on a host level (incoming and outgoing trust relationships for each host) or user level. The display may be restricted to a subset of the access relationships. The access graph may also be displayed in a nested form and the partitioning used for such nested display may be precomputed. Also, replaced and/or deleted access relationship may be visualized, e.g. be displayed in different color.

In the following processing of changes to authorized keys and possible ways these may affect the access relationships is considered. Authorized keys for protocols such as e.g. OpenSSH™ can be configured in one or more files and optionally directories that are processed in a well-defined order. The order of configured authorized keys is relevant as a prior configured authorized key shadows any later configured authorized keys with the same public key, and the authorized keys may have different options and restrictions configured for them. Furthermore, many organizations want to track the lifetime of each authorized key, and do not want to consider a key changed when only unrelated keys in the same authorized keys file are modified.

Figure 12:
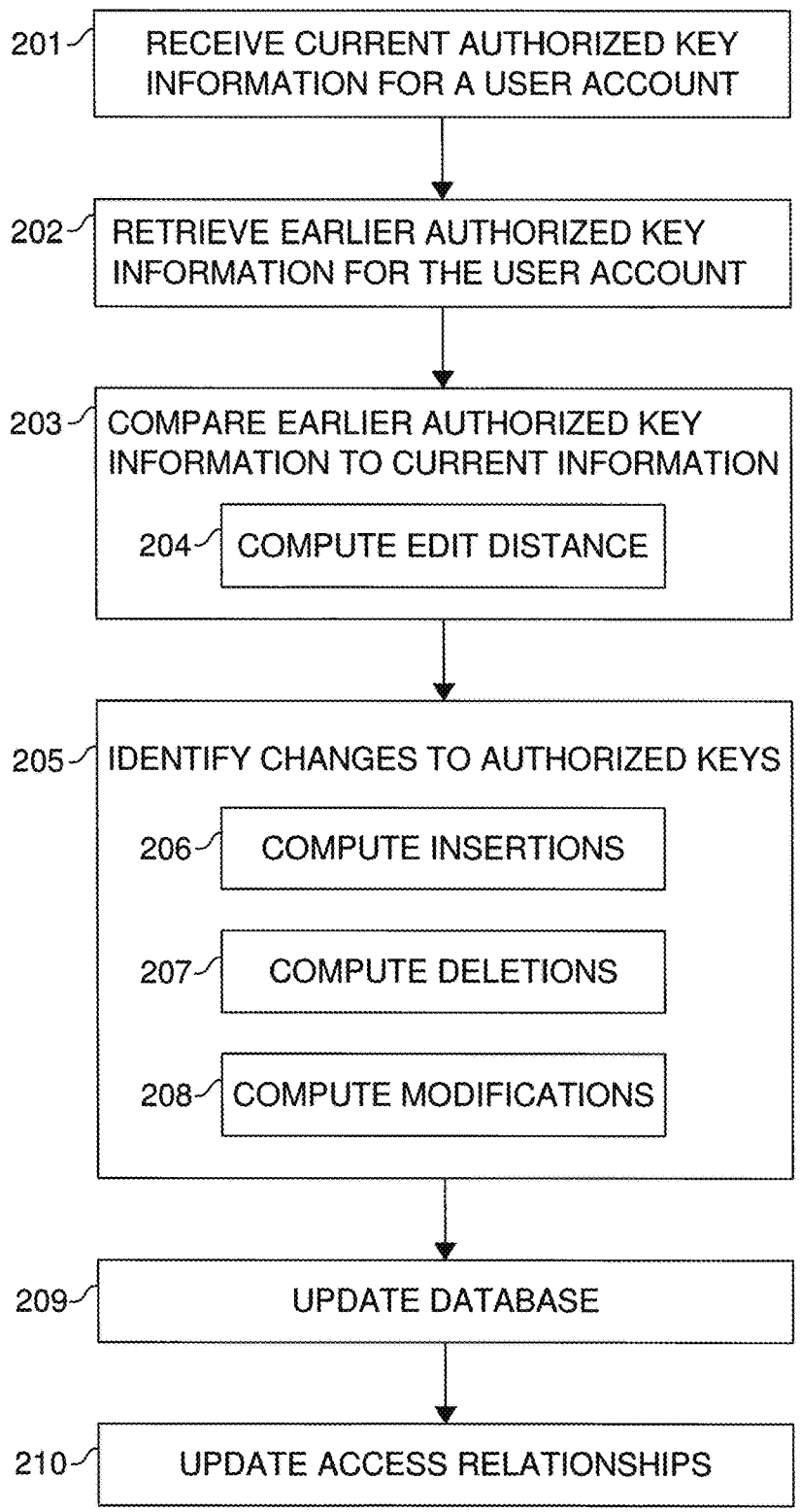

A solution is presented for identifying how which authorized keys have relevant changes with reference to FIG. 12 illustrating processing of collected authorized key information for a user in an embodiment. In this aspect changes to authorized keys are correlated and processed. Identity key information may be processed in a similar fashion. It can be advantageous to treat identity keys to be in the order in which they would be processed by a client, e.g. by an SSH client, just as authorized keys would be considered as being in the order in which they would be processed by a server, e.g. an SSH server.

New authorized keys are received 201 for at least one user account. The information may be received, e.g., as a result of the collection stage. The information may originate from configuration files on one or more hosts, directories, and/or databases. It is noted that the disclosure is not limited by the origin of the new information, how it is preprocessed to derive the new authorized keys, or how frequently updated information for the same user account(s) is received, nor to limit the nature of receiving. Instead, what is important in here is that new information becomes available, by whatever means.

Earlier authorized keys for the at least one user account are retrieved 202. They may be, e.g., read from an SQL database.

The discovered new authorized keys are compared to earlier authorized keys at 203. Advantageously, the comparing determines which authorized keys have been inserted, deleted, and/or modified since the earlier authorized keys were received. Advantageously, an algorithm that computes substantially the smallest set of such operations is used.

Authorized keys may be converted to a string whose symbols are identifiers for the key pairs used in the authorized keys. An algorithm can be used for computing an edit distance between the string representing the earlier authorized keys and the string representing the new authorized keys. According to a more a precise example, the edit steps needed to get to the new string from the earlier string are defined. An example of such algorithm is the Levenshtein distance. An example of how to determine the edit steps is given by the "diff" program in Unix/Linux. The "diff" program with the "-u" option can be used for computing the steps, if the strings are represented as files where each line contains an identifier for a key. According to one alternative, the equivalent of "diff" can be used on the raw list of authorized keys. This approach may not however permit distinguishing modifications from insertions and deletions as easily as the first mentioned.

Authorized keys determined as equal in a symbol-for-symbol (symbol representing key pair) can then be inspected for changes in individual attributes. The attributes can be such as options specified for each authorized key.

The changes to authorized keys are identified at 205 based on the results of the comparison. When the edit steps are available, insertions can be computed at 206 as those authorized keys entries whose symbols needed to be inserted to get to the new string; deletions can be computed 207 as those authorized keys whose symbols needed to be deleted to get to the new string; and modifications can be computed 208 by comparing the authorized keys entries whose symbols (key pairs) remained unchanged to determine which attributes, if any, of the authorized keys have changed. Modifications are those cases where there is some change.

The database is then updated at 209 according to the identified insertions, deletions, and modifications. New records may be inserted to the database to insert new authorized key objects in the database; existing records may be deleted from the database to reflect the deletion of the corresponding authorized key entries (or alternatively, the records may be marked as having been deleted, possibly by writing a timestamp indicating when they were deleted into a field of the records), and records whose attributes have changed may be modified (e.g., new values updated to fields). Any changes may also be logged in an audit log or in key history records.

The changes can be taken into account in determining chained access relationships. For example, a change even can trigger re-computation of the chained relationships. According to a possibility a periodic re-computations based on the latest data stored in the database are performed.

When an authorized key is replaced by another key (e.g., it has been rotated or rekeyed), that may be treated as an insertion and a deletion, or it may be identified as a replacement.

In a sense, each authorized key in the new and earlier data is classified into categories for unchanged, insert, and deleted keys, and possibly also for replaced and/or modified keys. Keys in each category form a set of keys. The set can be expressly represented or only implied.

Each authorized key may be assigned a sequence number indicating its location in the order in which authorized keys would be processed by an applicable server, e.g. SSH server. Insertions may change sequence numbers of keys that would not otherwise change. Advantageously, a change in a sequence number is not treated same as other modifications of an authorized key. In particular, it may not make sense to log the change in the sequence number in an audit log, as the authorized key itself did not change.

In some SSH implementations, if there are multiple authorized keys entries configured for the same key pair, only the first of them will actually be used. There may also be duplicate authorized keys entries. Advantageously, duplicate authorized keys are detected and a notification about them is provided to a user. Furthermore, advantageously authorized keys entries that are shadowed by another authorized keys entry, i.e., never actually processed by an SSH server because there is an earlier authorized keys entry for the same key pair, are identified. Such authorized keys may be ignored, or they may be stored in the database with a marking that they are currently shadowed. Deletion of another authorized key entry may unshadow another authorized keys entry, and such unshadowing may be treated as a modification of that other authorized keys entry. Access relationships resulting from shadowed authorized key entries may be deleted or they may, e.g., be marked with an indication that they can never actually be used because the authorized key is shadowed.

It is anticipated that in most cases only a few if any authorized keys configured for a user are determined to change compared to previously obtained configuration information. The computed insertions, deletions, and modifications can be used to trigger updating access relationships 210 involving the affected authorized keys. This can result the creation or termination of direct access relationships as discussed above.

Examples of representing access relationships in a computerized environment are described next. A computing environment can comprise a large number of computer devices where automated access between the computers is desired to facilitate efficient operations such as system administration, auditing, data transfer and integrating of processes, such as business, security and/or policy based processes. Such automated access can be configured using, e.g., SSH keys, Kerberos keytabs, host-based authentication, stored passwords and so on. A data structure is disclosed for representing such access relationships in a computerized system that enables fast updates and efficient queries in an access graph.

Figure 13:
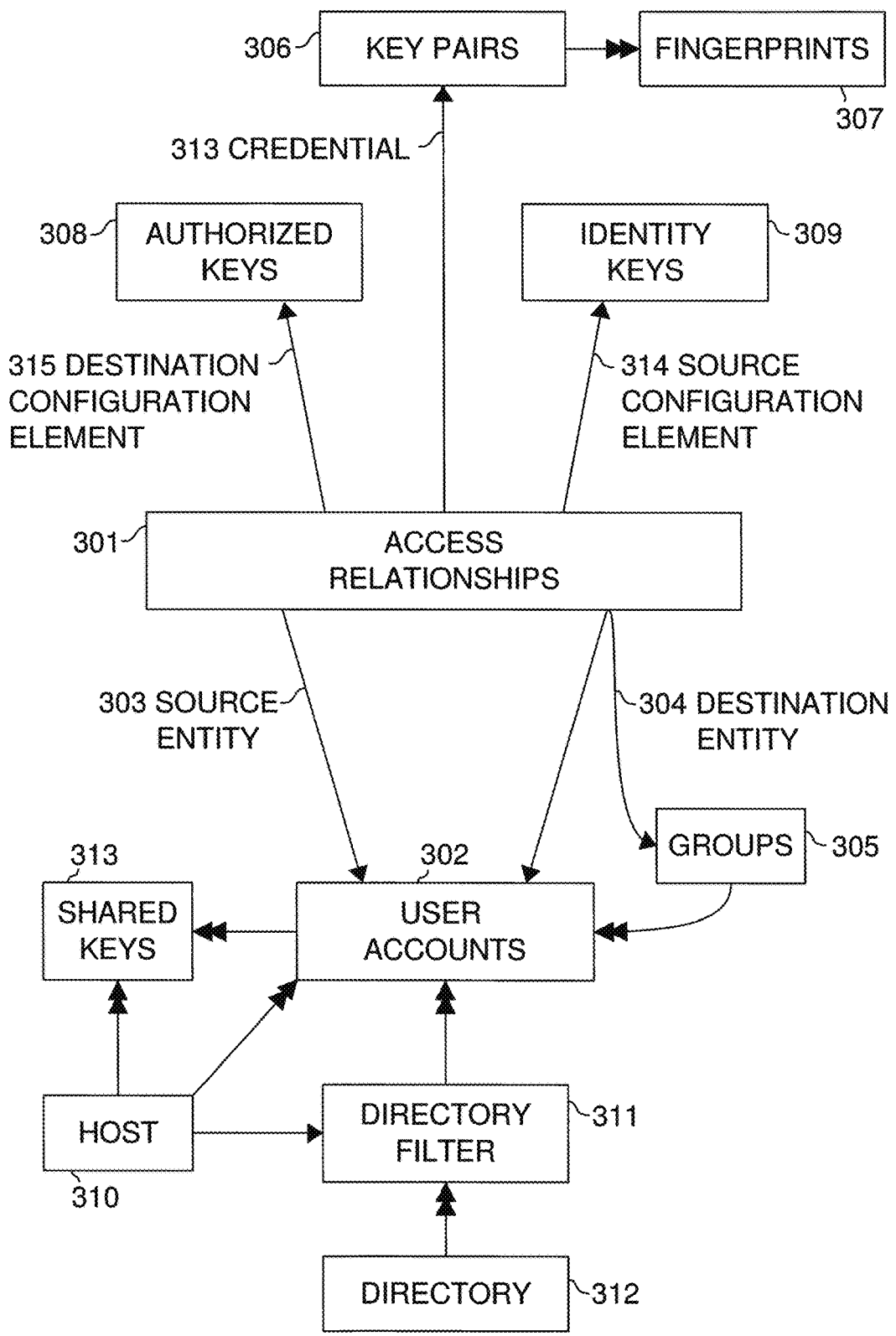

FIG. 13 illustrates an example of a data structure for representing access relationship information. Advantageously, the various objects are stored as one or more records in a relational database, such as MS SQL™ database, Oracle™, or PostgreSQL™ database in a non-volatile memory. However, they could also be stored in non-relational data stores.

Objects 301 represent access relationships. They are linked to various other objects, and may comprise, e.g., an identification 303 of one or more source entities, identification 304 of one or more destination entities, identification 313 of one or more credentials, identification 314 of one or more source configuration elements (such as identity keys/private keys 309), and/or identification 315 of one or more destination configuration elements (such as authorized keys/public keys 308). The credentials may be e.g. key pairs 306 which may be associated with one or more fingerprints 307. SSH keys are an example of appropriate credentials. However, there can also be objects for other kinds of credentials than SSH keys, such as Kerberos credentials, host-based access, passwords, methods/parameters for obtaining a password or key from a vault, and/or certificate-based access.

A credential relates to the authentication method using which the access relationship is configured. For example, SSH keys are used for configuring access relationships using SSH public key authentication, and Kerberos credentials can be used for configuring authentication using Kerberos or GSSAPI (Generic Security Services Application Program Interface) authentication.

An access relationship may also be associated with an indication of the time or date when it was created or discovered, and an indication of whether it is still valid. For example, an indication when an access relationship ceased to be valid can be provided. Such indication may not present or have a special value if the access relationship is still valid.

It may be possible for a key pair record to exist without its public key being known, the key pair only being identified by one or its fingerprints. Since different fingerprints may be used e.g. by different SSH implementations, it may be possible that there be more than one key pair object actually referring to the same key pair if the key pair objects were created in response to seeing a previously unknown fingerprint in syslog data. Once the public key corresponding to such fingerprints is learned by obtaining configuration data for it, the separate key pair objects corresponding to it may be merged into one object, and references to any merged key pair objects replaced by a reference to the remaining object.

Objects representing user accounts 302 may represent local user accounts at a host and be linked to objects representing hosts 310. They may also represent user accounts in a directory and be linked to a directory 312 and/or objects representing directory filters 311. The latter can be specifications which users from a directory exist on or can access a particular host, possibly specified via groups of hosts. Objects representing groups 305 may also be used as destination entities, and may be used to represent that the access relationship applies to all users in the group, on all hosts that the users in the group have access to. It is noted that different users in the group may have access to different hosts.

Shared keys 313 may be stored on NFS (network file system) volumes and be used on many hosts and possibly by many user accounts. On the other hand, the same user account on a directory might use a different NFS server on different hosts and thus relate to different sets of shared keys. Also other kinds of credentials, such as Kerberos credentials, could be shared in a similar fashion and represented similarly in the database. Shared credentials could include both shared private keys and shared authorized keys.

User account objects may be created to represent, e.g., a user in a directory, a user on a particular host (e.g., if the user is local or is a directory user with keys stored in a local directory), a user with a particular set of shared keys, or a user account on a set of hosts wherein each host in the set has the same set of shared credentials configured. The user account objects actually relating to the same user or person may be linked together so that all keys and access relationships relating to the same user can be quickly found in a single SQL query.

Directory filters may be used to represent all hosts that get the same set of user accounts from one or more directories. This enables whatever conditions apply to existence or accessibility of user accounts on particular hosts to be pre-evaluated, without having to be re-evaluated every time information is queried. Directory filters can be used to represent groups of hosts that get the same results from such evaluations and may be maintained as host configuration is scanned and as information from directories such as LDAP directories and Active Directories is collected.

Updating access relationship objects in a database will be considered next. When authorized keys or identity keys configured for an entity (e.g. a user account) change objects representing access relationships are updated. Access relationships that should no longer be valid are identified and they are deleted or their status updated. Access relationships that should exist but do not exist in the database are identified and inserted in the database. Changes in access relationship properties are identified and updates are made to the database.

Figure 14:
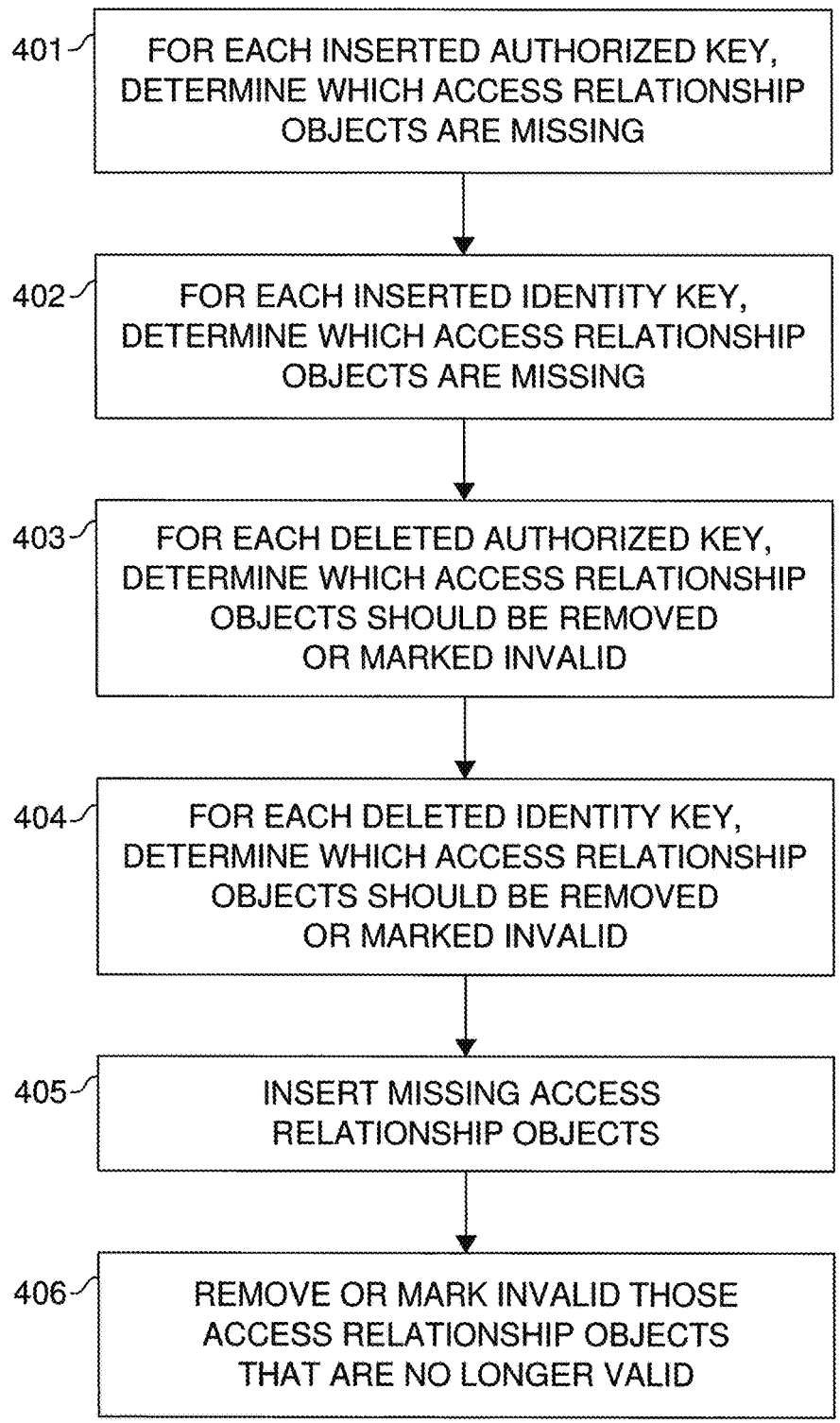

FIG. 14 illustrates an example for updating access relationship objects in response to inserted or deleted authorized keys and/or identity keys. Modified keys are treated as deletion followed by an insertion in this context; however, it would also be possible to have a special updating mechanism for them that updates existing access relationship objects to reflect the modification.

For each inserted authorized key, it is determined which access relationship objects are missing 401. This can advantageously be implemented using a single SQL query that joins an inserted authorized key object with those identity key objects for the same key pair for which there does not exist an access relationship object that uses the authorized key object as its destination configuration element and the identity key object as its source configuration element. It is possible constrain this by other attributes.

For each inserted identity key, it is determined which access relationship objects are missing 402. This can advantageously be implemented using a single SQL query that joins an inserted identity key object with those authorized key objects for the same key pair for which there does not exist an access relationship object that uses the authorized key object as its destination configuration element and the identity key object as its source configuration element. Again, it is possible to further constrain this by other attributes.

For each deleted authorized key, it is determined which access relationship objects should be removed or marked invalid 403. This can be advantageously implemented using a single SQL query that searches for access relationship objects that use the authorized key as their destination configuration object and that have not already been marked invalid.

For each deleted identity key, it is determined which access relationship objects should be removed or marked invalid 404. This can be advantageously implemented using a single SQL query that searches for access relationship objects that use the identity key as their source configuration object and that have not already been marked invalid.

Access relationship objects that were determined as missing are inserted 405. This can be implemented using SQL insert statements.

Access relationship objects that are no longer valid are removed or marked invalid 406 (these are the objects that should be removed or marked invalid).

Removing an object can be implemented using an SQL delete statement. Marking an access relationship object invalid may mean setting a field in the access relationship object to indicate it has ceased to be valid, for example by writing the current time and/or date to a field of the access relationship object to indicate it was no longer valid after that date. This can be implemented using SQL update statements.

Each access relationship object may comprise a count indicating how many identity key—authorized key combinations indicate that the access relationship should exist. When a new access relationship object is inserted, it is inserted with a count of one. When it should be inserted again, but it already exists, the count is incremented. When it should be deleted, the count is decremented. If the count reaches zero, the access relationship object is removed or marked invalid. It would be equivalent to add a constant to all count values or to multiple all count values by a non-zero constant, or represent counts using strings or other representation convertible to a number.

Besides an SQL join, any other mechanism for matching identity keys with authorized keys involving the same key pair could be used. For example, exhaustively looping over all authorized keys and identity keys and comparing them would be a possibility, as would be a lookup of matching authorized keys for each inserted identity key or vice versa. The lookup could be implemented, e.g., using an index data structure or using separate SQL queries.

Figure 15:
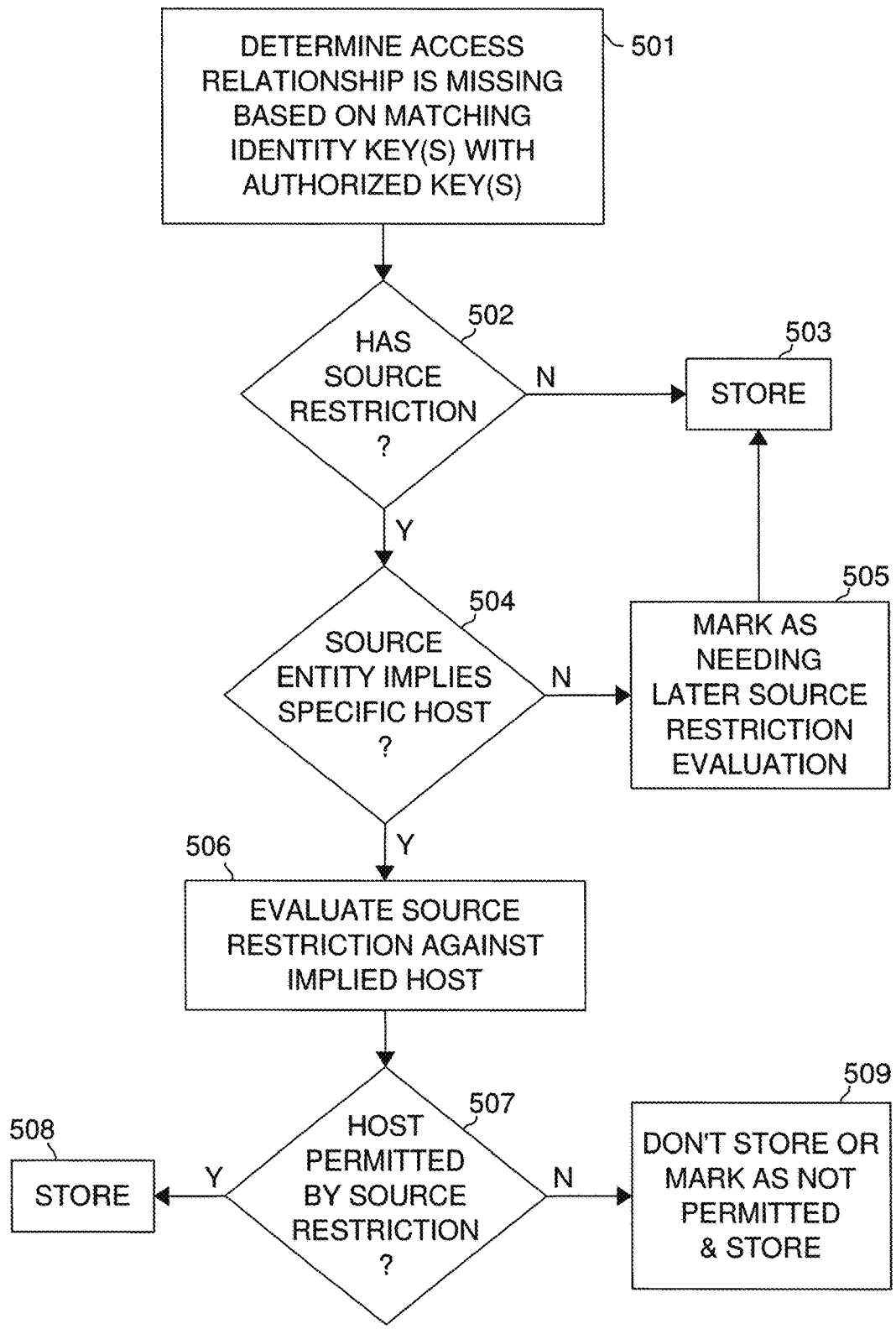

Not all access relationships indicated by identity key and authorized key matching are necessarily usable in practice. For example, SSH authorized keys can be configured with a source restriction, an option specifying which hosts (IP addresses, subnets, and/or host names) the authorized key can be used from. Filtering identified access relationships by source restrictions can be provided to address this. In the filtering, in addition to matching private keys against authorized keys, source restrictions (e.g., "from" option in an SSH authorized keys file) are evaluated against information about one or more entities (e.g., users or hosts) having access to the private key to determine if the entities are permitted to use the authorized keys. An access relationship might not be stored or considered to exist if such use is not permitted. Alternatively or in addition, such situations may be trigger alerts, audit reports, or be displayed FIG. 15 illustrate filtering of identified access relationships by source restrictions. The filtering may result in eliminating some objects representing access relationships, reducing the size of the tables used for storing such objects. The filtering may also be used to cause access relationships not matching the filter to be marked as not actually usable, or violating a source restriction constraint. Such violations may be of interest and may be listed in a report, made available in a user interface, or trigger alerts. Furthermore, attempts to actually use a key in violation of a source restriction (as detected, e.g., by parsing syslog messages generated by SSH servers) could be an indication of an attempted attack and could be cause for triggering an alert.

Source restrictions in SSH keys may use a variety of complicated patterns, including regular expressions. It is not always possible to determine from a source restriction exactly which hosts it will permit. However, it is possible to evaluate a source restriction with respect to information about a particular host, and determine whether that host is permitted.

Access relationships are usually between user accounts, although can also be specified between other kinds of entities. Local users on a host are bound to a particular host, and it is possible to evaluate whether access from such account is permitted by a source restriction. However, user accounts defined in directories may be exist on multiple hosts, only some of which may be permitted by a source restriction. In such cases, the result of evaluating the access relationship may vary depending on which host the user tries to access from. Similar issues may occur with shared keys.

One possible approach to access relationships whose source or destination is not bound to a single host would be to enumerate all hosts and accounts on which their source and destination can be present, and evaluate source restrictions separately for each possible source host and account, and insert access relationship objects for each such combination, or those permitted by the source restrictions. However, an organization may have tens of thousands of users that are present in computing clusters comprising tens of thousands of servers. Generating, evaluating, and storing all combinations may become computationally prohibitively expensive. Yet in many organizations, the majority of keys are used with host-local user accounts.

While source restrictions have historically been uncommon, their use is rapidly increasing as organizations tackle key management and see source restrictions as a good way of restricting the use of copied keys.

FIG. 15 illustrates filtering identified access relationship by source restrictions in an embodiment. First it is determined that an access relationship object is missing based on matching identity key(s) with authorized key(s) 501 (see FIG. 14). It is checked whether an access relationship is subject to a source restriction 502 (e.g., by checking whether the authorized keys entry has a "from" option). If it has no source restriction, an object for the access relationship is stored 503. If it has a source restriction, it is determined whether the source entity of the access relationship implies a specific host 504 (e.g., a local user account on a host implies that host). If not, the access relationship is marked as needing later source restriction evaluation, and an object for it is stored 503. If a specific host is implied, the source restriction is evaluated against the implied host 506. The evaluation may use, e.g. the IP (Internet Protocol) address(es) and host name or name resulting reverse mapping its IP address using DNS (Domain Name System).

If the implied host is permitted by the source restriction 507, then an object for the access relationship is stored 508 (possibly with a marking indicating it was permitted by a source restriction). If it is not permitted, the access relationship might not be stored or it might be stored by marked as not permitted by an access relationship 509 (so that it can be easily found for reports and it could be eliminated from displays or displayed in a distinct fashion). Additionally, a notification of an access relationship not being permitted by a source restriction may be recorded or logged and an alert may be triggered.

A host may also be implied if a host has access to a private key used as identity key for the access relationship. This can be the case for host-local user accounts.

It would also be possible to implement the filtering after creating one or more access relationship objects, and delete or modify the created access relationship objects based on evaluating source restrictions. Not storing an access relationship would be equivalent to first inserting it and then deleting it.

Different security implementations may use different syntax. For example, different SSH implementations use different syntax for source restrictions (e.g., Tectia SSH Server™ and OpenSSH™ use different syntax), it may be advantageous to convert source restrictions to a common syntax before evaluating them. Common syntax here means a unified representation that can represent source restrictions for at least two implementations in the unified way, without altering the meaning of the source restrictions. The conversion may comprise converting regular expression to one canonical syntax (e.g., the syntax used in the Python™ programming language). Source restrictions may also be stored in a database in the common syntax to facilitate their easier evaluation at a later time. An aspect is determining user accounts and access relationships that exist on a particular host. The determining can be frequently provided when using and/or displaying access relationships. The determining can be fast. In certain computerized environments, automated access may be configured using groups and directory accounts that are present on more than one host. Methods and data structures can be provided for efficiently determining which user accounts exist on a host and which access relationships can originate or terminate at the host. While access relationships are in most cases defined between user accounts, and the user accounts are not necessarily bound to specific hosts, it is common practice, especially in initial inspection of access relationships, to inspect them at host level.

User accounts on a host may include, inter alia, local user accounts on the host and user accounts that exist on the host that are defined in a directory.

Access relationships for a user account may include, inter alia, access relationships defined for the user account itself if it is a local user account on a host using identity keys and/or authorized keys local to the host, access relationships defined for the user account (local or directory) using shared keys, access relationships defined for a user account in a directory (enabling access to all hosts where the user account exists), access relationships defined for a user account in a directory on a specific host permitting access to the user account only on that host (or a group of hosts if the access relationship uses shared keys), and access relationships defined for a group of users, granting access to all user accounts that are members of the group on hosts where those users exist. The access relationships on a host include access relationships for all user accounts on the host.

Some of the access relationships on a host may have a user on the host as a source entity. Some access relationships may have a user on the host as a destination entity. Some of the access relationships may have users on the host as both their source and destination entities. This can be so e.g., if such access relationships lead from one user on the host to another user on the host, or are self-loops, i.e., lead from a user to itself.

Determining which host a user account is local to may be implemented by having a field in an object representing the user account indicating the host that it is local to if it is a local account. Then, all local users on a host can be identified by an SQL query that searches for user account objects identifying that host in the relevant field.

FIG. 13 illustrates certain data structures that make these evaluations more effective. For example, directory filters can be used for quickly determining which directory user accounts exist on a particular host, and indexed SQL joins maybe used for many of the operations effectively. The description herein is based on using data structures similar to those illustrated in FIG. 13. However, the data structures may be structured differently and equivalent algorithms used.

Figure 16:
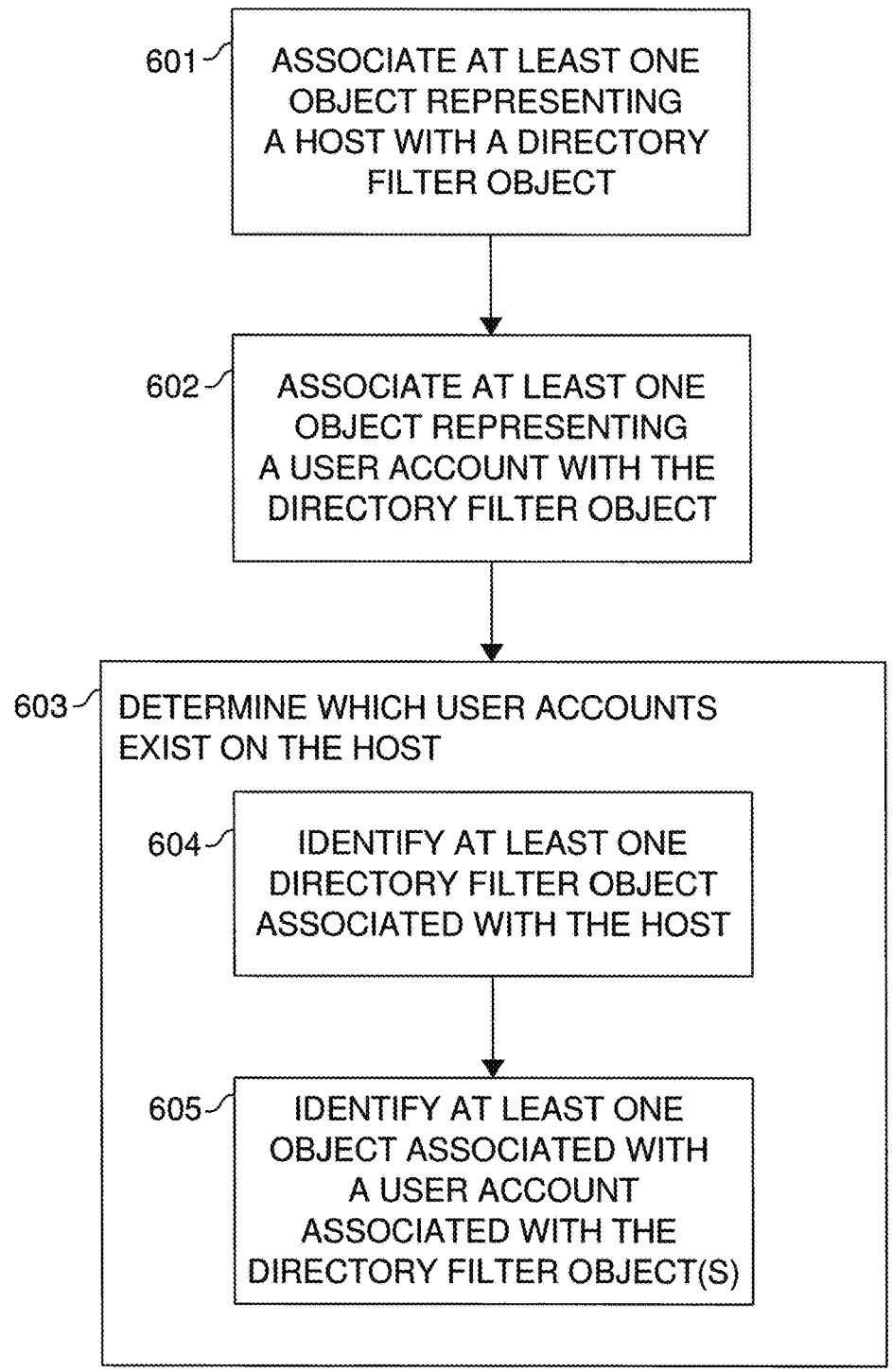

FIG. 16 illustrates an example for determining which user accounts exist on a host in an embodiment. While processing collected configuration data, when it is determined that a host has been configured to use user accounts from a directory, it is determined what kind of filter is used for determining which user accounts are present on the host. For example, it can be determined which base distinguished name must a user have to be present on the host or which group must the user be a member of. It is expected that many hosts will commonly have the same users, and therefore use the same filter. An object can be created in the database representing each distinct filter. The host objects for all hosts using the same filter are associated with the same directory filter object. A host may be associated with multiple directory filter objects, e.g., if it uses user accounts from more than one directory.

Thus, one or more objects representing a host may be associated with a directory filter object at 601. This association can be many-to-many, and may be implemented, e.g., as a table with one field identifying a host object and another field identifying a directory filter object.

User accounts may be enumerated from the directory. Each user account may be evaluated against all directory filter objects. Objects representing user accounts may be created for some or all accounts defined in a directory. An object representing a user account may be associated with those directory filter objects for which the filter evaluation indicates that the user account will be present on the host.

One or more objects representing a user account may be associated with a directory filter object at 602. This association can be many-to-many, and may be implemented, e.g., as a table with one field identifying a host object and another field identifying a directory filter object.

Determining which user accounts exist on a host 603 may comprise identifying at least one directory filter object associated with an object representing the host at 604. It may also comprise identifying at least one object representing a user account associated with any of the at least one directory filter object at 605. This may be advantageously implemented using an SQL join involving the host-to-directory filter association table and the directory filter-to-user association table.

Determining which user accounts exist on a host may furthermore comprise identifying all local user accounts on the host. These may be found using an SQL query on the user table that specifies that a field indicating to which host the user account is local must identify the host.

Figure 17:
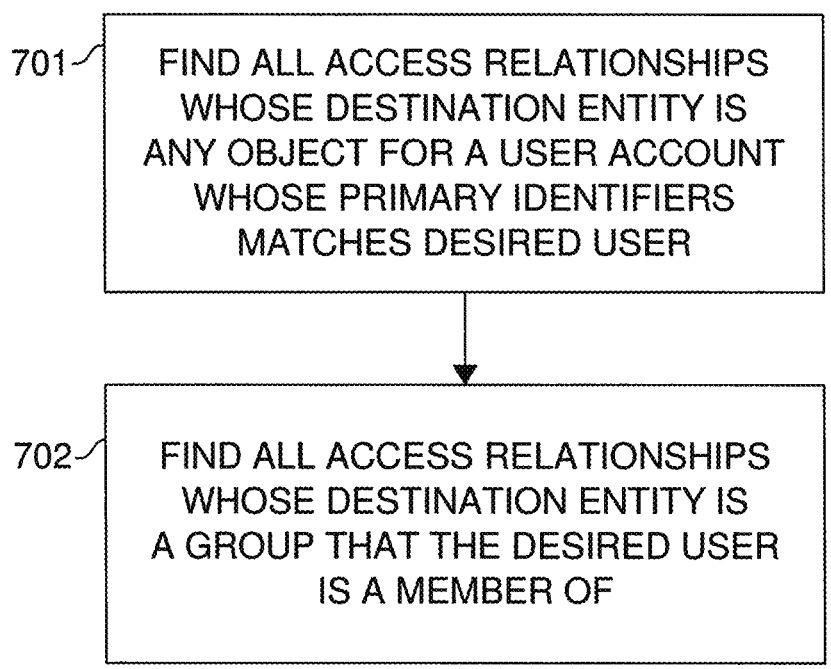

FIG. 17 illustrates determining which access relationships relate to a user account, using the given user account as a destination entity. Accounts relating to the user account as a source entity can be obtained by replacing the destination entity by the source entity in the algorithm. In this embodiment, it is assumed that the data structure for representing user accounts, access relationships, and other related concepts roughly corresponds to that illustrated in FIG. 13. Furthermore, it is assumed that there may be more than one user account object relating to an actual user account or person and that all user account objects relating to the same user account or person are linked together by a field, called herein the primary identifier of the user account. In this case all user account objects for the same user account can share the same primary identifier. Different user account objects for the same user account can be used for specifying locally configured keys and access relationships, shared access relationships, access relationships configured for all instances of a directory account, etc.

Alternatively, it would be possible to have one table for a primary user account object and another table for user account aspect object, where an identifier of a primary user account object corresponds to the primary identifier of the user account. Each object in the user account aspect objects table can have a field identifying a primary user account object. The method described herein could be readily adapted for this arrangement and several others.

To determine which access relationships relate to a user account using the user account as a destination entity, a computer device can be configured to look up all access relationships whose destination entity is any user account object whose primary identifier matches that of the user account at 701. The device can further look up all access relationships whose destination entity is a group that the user account is a member at 702.

Looking up all access relationships whose destination entity is any user account object whose primary identifier matches that of the user account can be implemented using a single SQL query that performs a join of a user account table with an access relationship table where the primary identifier of a user account matches the desired user and the identity of the particular user account object matches an identification of a destination entity in the access relationship table.

Looking up all access relationships whose destination entity is a group that the user account is a member of can be also implemented by a single SQL query that performs a join of a group membership table with an access relationship table. A field of the group member table that indicates group member identifier must match the primary identifier of the desired user and the group identifier of the user account must have a primary identifier that matches the desired user. Further, the group membership table must have a group identifier that matches the identification of a destination entity in the access relationship table.

Root trusts, that is incoming access relationships to a root account, can be found by determining which access relations the root account has that have the root account as a destination account. Any root accounts with root trusts can be found by finding all root accounts that have at least one access relationship with the root account as a destination account.

One approach to determining all access relationships on a host is to find all user accounts on the host, and then find all access relationships for each of those user accounts. However, the methods described above do not restrict the returned access relationships for the user accounts to those that can actually involve the host. For example, there may be locally configured keys for a user account in a directory that cannot be used on other hosts where the user account exists, or shared keys that can only be used on those hosts where the user account exists that have those shared keys. Thus, a straightforward approach can result in extra access relationships being returned for a host.

There are scenarios that may need to be considered separately. For example, access relationships specified for a local account or locally specified for a directory account where there is a user account object for the local aspect of the directory account. These may be included only if the implied host matches the desired host. These may also have any source restrictions precomputed. Another example are access relationships based on shared keys. These should be included if the host is one of the hosts having the shared keys and source restrictions are successfully evaluated. It is possible that these cannot be pre-evaluated in this case. A third example is access relationships based on groups and directory accounts that are not based on local keys or shared keys. These should generally be included if their source restrictions are successfully evaluated.

Successfully evaluating source restrictions can be determined to mean that source restriction permits the access relationship. Empty/non-existent source restrictions always evaluate successfully.

Figure 18:
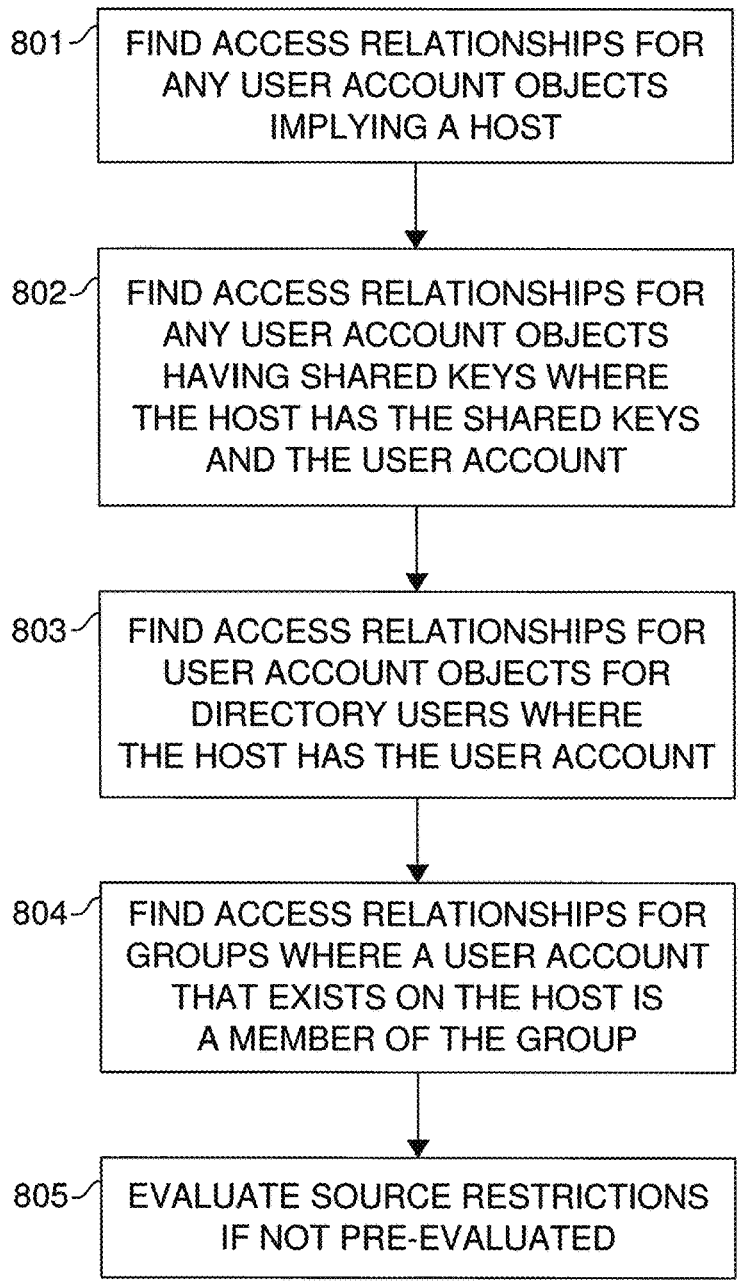

FIG. 18 illustrates an example for determining which access relationships exist on a host. That is, determination of relationships that can refer to a user account on the host as a source entity or destination entity.

Access relationships for any user account objects implying the host are looked up at 801. This basically looks up access relationships for local accounts on the host as well as access relationships based on keys configured in host-local directories for a user account defined in a directory. This can be implemented as an SQL join between the user account table and the access relationship table.

Access relationships for any user account objects having shared keys where the host has the shared keys and the user account are looked up at 802. Such user account objects represent an aspect of the user account having a particular set of shared keys. Such an user account is advantageously also linked with an object representing a set of shared keys, and hosts having that set of shared keys are linked with the set of shared keys. The lookup can be implemented as a join between a table representing the linkage between hosts and shared keys with the table representing user accounts and the table representing access relationships.

Access relationships for user account objects for directory users where the host has the user account are looked up at 803. The user accounts that exist on a host can be determined using directory filter objects, as described earlier. The implementation can be a join between a table linking hosts to directory filter objects, a table linking directory filters to user accounts, and a table of user account objects.

Access relationships for groups where a user account that exists on the host is a member of the group are looked up at 804. The accounts that exist on a host can be determined using directory filter objects, as described earlier. The implementation can be a join between a table linking hosts to directory filter objects, a table linking directory filters to user accounts, a table specifying memberships in groups, and a table of user account objects.

The source restrictions, if any, in found access relationship objects are evaluated at 805 unless the access relationship objects indicates that they have already been pre-evaluated. Only access relationship objects permitted by source restrictions are advantageously included in the results, though it would also be possible to mark access relationships not matching source restrictions with a suitable marking. If looking for access relationships having a destination entity on the host, the source restrictions are not restricted by the host; however, when looking for access relationships having a source entity on the host, the source restrictions may eliminate one or more of the found access relationships.

According to an aspect pivoting can be determined. The pivoting can be identified e.g. based on an access relationship graph. Pivoting in the context of SSH key based access means an arrangement enabling access to a first user account using one key and then access a second user account from the first user account using a key that the first user account has access to. It can be determined whether a particular user account can be used for pivoting and which user accounts may be used for pivoting. The mechanism can further be extended to pivoting involving different authentication methods for access to the first user account and for access to the second account.

Figure 19:
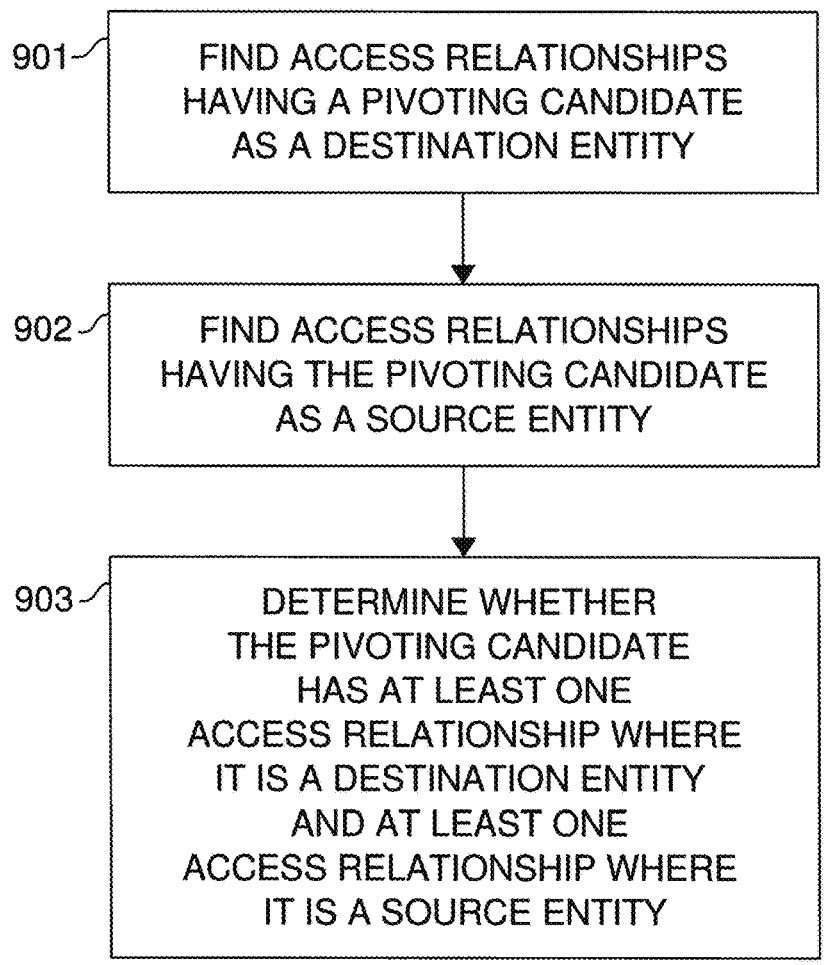

Some security policies forbid pivoting, that is, having a user account (or possibly host in some scenarios) with both incoming access relationship (i.e., one having the user account as a destination entity) and an outgoing access relationship (i.e., one having the user account as a source entity). FIG. 19 illustrates an example for determining whether a pivoting candidate (user account or host) can be used for pivoting in such scenario. Access relationships having the pivoting candidate as a destination entity are looked up at 901. Access relationships having the pivoting candidate as a source entity are looked up at 902. It is determined at 903 whether the pivoting candidate has at least one access relationship having the pivoting candidate as a destination entity and at least one access relationship having the pivoting candidate as a source entity. If so, the pivoting candidate can be used for pivoting.

It can be sufficient to look up only the first access relationship in each of the 901 and 902 steps, or even to just determine whether at least one such access relationship exists in each case, without actually reading the access relationship. However, it may be desirable to evaluate source restrictions before considering an access relationship as existing.

Looking up access relationships can follow the methods presented for looking up access relationships for a user account or for a host, and take into consideration the different ways in which an access relationship may be represented for an entity.

Access relationships can also be controlled without scanning of keys based on direct use of an access relationship map. That is, access relationships can be managed based on e.g. operator settings defining who has access and to where.

Figure 20:
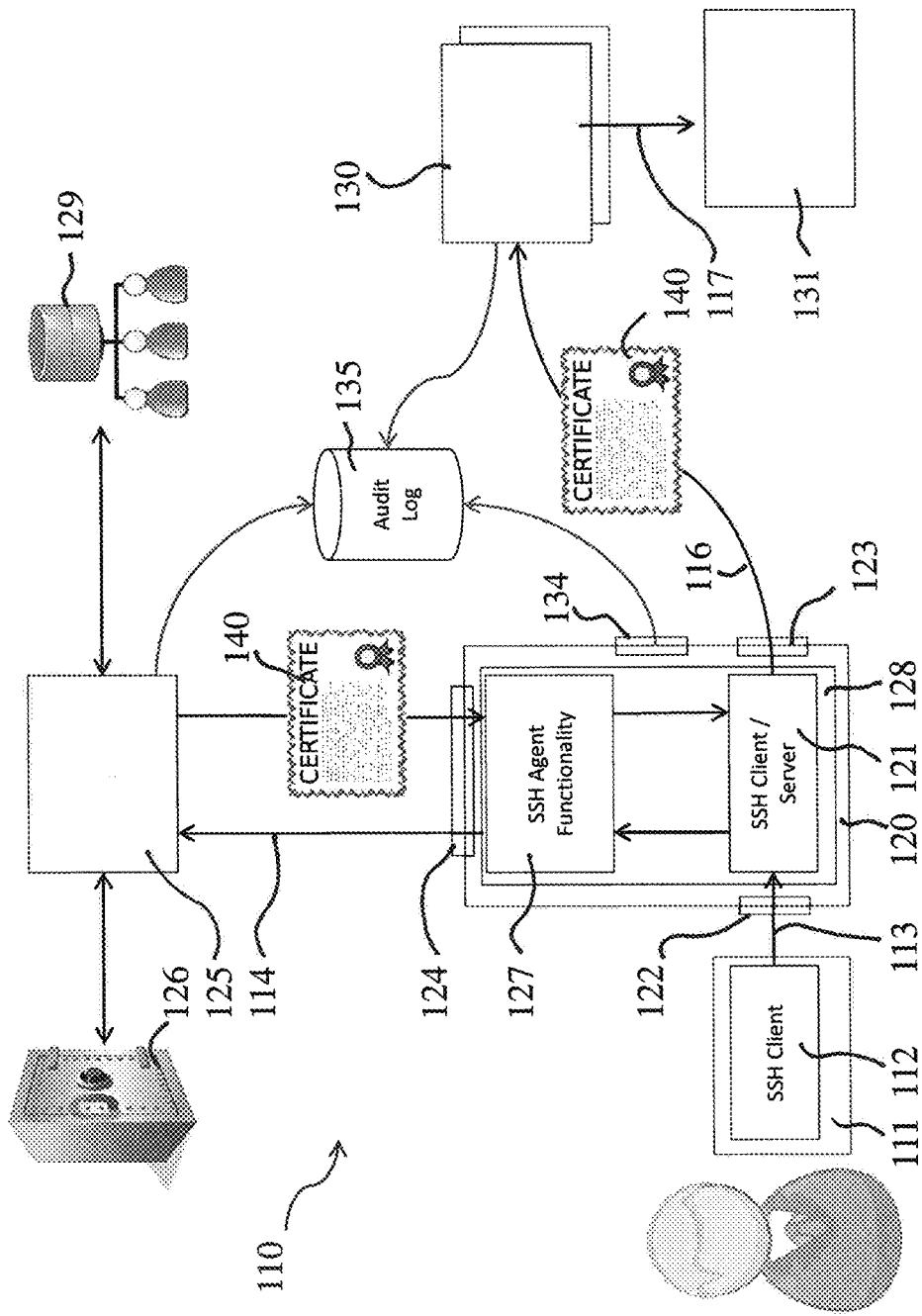
FIGS. 20 and 21 show further examples of network environments where the invention can be implemented.

FIG. 20 shows another example of a computerized network system 110 where the herein described principles may be embodied. More particularly, FIG. 20 shows a specific example of an intermediate device 120 configured to provide a security function between hosts and devices capable of accessing the hosts. In this particular example a user accesses, using his/hers user device 111, one of hosts 130, 131. A host may be provided, e.g., by a server or another data processing entity. A host may also be provided in virtual environment based on cloud computing. The access path via the network is indicated by arrows 113 and 116 from the user device 11 to a host 130. The host 130 is shown to have an access relationship 117 to a further host 131.

The intermediate device of this aspect comprises interface apparatus 122, 123 configured for communications with the hosts and devices requesting access to the hosts such that the intermediate device provides an intermediate node between the hosts and the devices. The intermediate device further comprises control apparatus 128 connected to the interface apparatus and comprising at least one a processor, and a memory storing instructions that, when executed, cause the control apparatus to perform tasks described herein. The processor can be configured to process a request from the device 111 for access to a host. After receipt of the request, the processor can obtain an authenticator or another security credential for use in the requested access. This may be provided by sending a request 114 to an external security device 125 and receiving an authenticator 140 therefrom. Alternatively, the intermediate device may be provided with an integrated security device, and an authenticator may be requested therefrom. The intermediate device 120 is further configured to monitor communications that use the obtained authenticator. The intermediate device 120 may also be configured to control communications that have been established based on authenticators from the security device. The authenticator may comprise a certificate, the control apparatus being configured to request for the certificate from a security device providing a certificate authority (CA). The CA may be an external entity or integrated with the intermediate apparatus.

The user device 111 may comprises a mobile device connected to the network over air interface. At least a part of the connection can thus be provided over a wireless interface. For example, the user device may be provided wireless access to the communication network. A wireless connection to the network can be provided via a base station based on e.g., wireless local area network (WLAN), GSM/EDGE/HSPA, 3G, 4G, 5G, or WiMAX standards, and/or optical and near-field networks, or any future development of wireless standards. The user device may also comprise a computer device that is connected to the network via fixed line connection.

The access to the communication network can be secured based on an appropriate security protocol. The control apparatus 128 may comprise an authentication component configured to authenticate the request for access to a host prior to sending a request for an authenticator to a security device. For example, secure shell (SSH) protocol, secure sockets layer (SSL) protocol, transport layer security (TLS) protocol or the like may be used.

A network system and communications therein can be constantly monitored by the intermediate apparatus to protect the system from attacks by malicious users and data leaks and other unauthorised data communications and/or to prevent data loss. The monitoring can also be applied on encrypted communications. An intermediate apparatus may also be configured to intervene communications. Intervention can be provided for various reasons. Intervention can be used to create data e.g. for defensive, analytical and audit purposes and/or for preventing loss of data. A way to provide this is to capture and analyse data communicated between two parties by an appropriate intermediate node.

At least a part of data flowing through the intermediate device can be encrypted. In such case the intermediate data processing device can be configured to provide a man-in-the-middle (MITM) type operation on the encrypted data flowing there through to obtain the plaintext of the data. The MITM operation involves decryption of encrypted data. This can be based on knowledge of the private key or other encryption credential used in the encryption. The data capturing intermediate node is operated and maintained by a trusted party, typically the owner of the network, and can thus be provided with the necessary keys and/or other security information required for the decryption. It is noted that this is only an example and that the shown architecture and/or MITM type operation is not necessary in all scenarios. For example, the monitored passing data flow can also be plaintext, for example plaintext transport control protocol (TCP) or user datagram protocol (UDP) communications. Instead of the shown arrangement other network arrangements and modes are also possible. For example, interfaces can be in a bastion mode.

A data capture device such as a crypto auditor can be provided as a standalone hardware component or embedded in another element, e.g. in a firewall or the like component. The data capture device can also be provided as a virtual machine set up in cloud computing environment. A firewall may contain one or more protocol proxies, such as an secure shell (SSH) proxy, remote desktop protocol (RDP) proxy, virtual network computing (VNC) proxy, file transfer protocol/secure (FTP/S; FTP over secure sockets layer (SSL), transport layer security (TLS) protocols) proxy, or HTTP/S (HTTP over SSL/TLS) proxy. A proxy may also implement more than one protocol. Each proxy can contain a man-in-the-middle component for performing man-in-the-middle operation, or key escrow or other suitable method, for obtaining access to the plaintext of the session.

In FIG. 20 communication sessions between the user device 111 and the hosts flow through the intermediate data capturing apparatus 120. The intermediate node 120 hosts a data capturing entity configured to monitor traffic going there through and capture data for e.g. data audit purposes. The captured data may be processed and/or stored at the intermediate node. According to a possibility at least a part of captured data is forwarded to another entity for storage and/or processing. This is denoted by an audit log entity 135. The audit log entity may correspond with the intermediate apparatus via interface 134. Hence the apparatus can be called a crypto graphical auditor, or in short crypto auditor. It is noted that the manner how the captured data is processed as such, e.g., decrypted and analyzed, for audit purposes is of lesser relevance in view of understanding the herein disclosed principles. What is relevant is that user devices can access hosts via an intermediate data capturing apparatus and that data, including request for access and communications after the access has been granted, communicated between the devices is routed via the intermediate apparatus.

The intermediate device obtains an authenticator for use in the requested access to the host, and can monitor communications that use the authenticator. The use shall be understood to refer to use of the certificate or another security credential for the access and, depending on the application, use of the credential for other purposes during established communication session or sessions. The monitoring may be based on at least one condition. At least one condition may be set by the intermediate device independently of the security device. It is also possible to receive at the intermediate device information of at least one condition from the security device. According to a specific aspect a validity period is assigned for the authenticator that is shorter than a validity period of a second authenticator used for authentication of the request for access received from the device. The validity period of the authenticator may also be set to be shorter than a validity period of the authenticator received from the security device. Also, the validity period of the authenticator may be defined to be shorter that maximum session length defined in association with the host and/or maximum session length defined in association with the device. The monitoring can also comprise monitoring usage of the authenticator. For example, where the authenticator is used, how, the amounts of data transferred, by whom and/or when the authenticator is used can be monitored. The identity of the user of the authenticator (the device and/or the user) can be monitored to ensure that it has not fallen into wrong hands. The host, and any changes in the host may be monitored. Behaviour of the device can also be monitored. For example, it can be detected that there is a pause in the established communications. It can then be determined whether the pause is acceptable, or whether the authenticator shall be revoked and/or communication session terminated. Various events associated with one or more communication sessions established based on the authenticator may also be monitored. For example, if a user having a communication session established based on an authenticator from a security device has a great number of other communications session, or tries to open more than acceptable number of communication sessions, or if there is an attempt to intervene such a communication session, an appropriate control action may be taken.

FIG. 20 shows a separate security device, and more particularly an authorization server 125. The authorization server can comprise a certificate authority (CA) providing a certificate issuing functionality of the network system. The security device such as a CA can communicate with a system of record 129 to authenticate users and get additional information, for example group information. The security device can further implement policy decisions. A policy decision can include, inter alia, how users are authenticated, how user groups map to principals, and which options and extensions are included in the certificate. The system of record 129 can provide an authoritative user information registry. The system of record can be arranged to provide an authoritative source of user information and system policy definitions. On customer environments this can be e.g. an Active Directory; a Lightweight Directory Access Protocol (LDAP) directory/OpenLDAP directory holding users and groups (principals). Users can be uniquely identifiable by the system of record. Other user attributes can also be used to identify a user during the authentication flow. Other examples of IDs include e.g. email address, other address information such as telephone number, user account names etc.

The intermediate monitoring device 120 comprises appropriate interface apparatus for communication with the various other entities. In the example interface 122 is for communications with the user device 111. When the user initiates access, using his user terminal device 111, to a target host, instead of accessing directly the target host, the user access first the intermediate device 120. The access to the device 120 can be handled by a client 112 provided at the user device 111 and configured to communicate with a client or server 121 provided at the intermediate device 120. Communications 116 between the intermediate device 120 and the hosts can be handled via interface 123. The communications can be based on an authenticator obtained from the security device 125. Interface 124 can be provided for communications with the security device 125. It shall be appreciated that the separate interfaces are shown for clarity, and denote logical interfaces. The interface apparatus may comprise a different number of physical connections from that shown, or just one physical connection. Furthermore, the security device may be provide within the intermediate node or as a therein integrated component, and thus the interface between the intermediate device 120 and the security device may be an internal interface within device 120.

An agent 127 for communication towards the security device 125 may also be provided in some examples. The agent can be configured to implement a SSH agent protocol, communicate e.g. with the CA, obtain user authentication information, and take care of the user authentication authenticators, for example keypairs.

The intermediate device 120 terminates the session of the user and may authenticate the user based on an auditor policy. The intermediate device can embed a CA client functionality and use the CA client to sign the public key of the user with the CA. The CA can verify the user authentication information with the system of record. CA can also resolve the user principals with the system of record. CA creates the certificate containing the user public key and other attributes, for example the principals, and signs the resulting certificate with its private key. Crypto auditor device uses the certificate in the authentication together with the corresponding private key. The target server then verifies the certificate of the user. The target server verifies that the user principals can be used to log in to the requested system account.

In the scenario of FIG. 20 a chain of access relationships may be created from the user device 111 via the intermediate apparatus 120 and host 130 to host 131. The intermediate apparatus 120 may be configured to determine whether an access relationship chain shall be replaced with a direct access relationship between the intermediate device 120 and the host 131, and create this relationship accordingly. This may be based on the procedure involving the security device 125 as described above. The intermediate device may also determine that a direct access relationship to host 131 shall be replaced by access relationships routed via another node such as one of hosts 130. Intermediate device can then take necessary action to reroute the access relationships via the appropriate node or nodes.

According to a further aspect for accessing host in a hybrid computer network environment is described with reference to FIG. 21. It is noted that in FIG. 21 several elements may be similar to those of FIG. 20, and therefore those are not described in detail here. A hybrid environment may comprise at least a first type of hosts 132 and a second type of hosts 134. Because of this different logging credentials may be needed for a user to be able to access a target host. An operation that is transparent for the user can be provided by an intermediate apparatus 138 configured to determine the type of the target host the user wants to access and the authenticator(s) or other security credentials needed for access to the target host. The intermediate apparatus can obtain, as appropriate, authenticators from a security device 136. The correspondence with and/or determination can be provided by an agent 139 comprised in the intermediate apparatus 138.

The intermediate apparatus comprises at least one processor, and a memory storing instructions that, when executed, cause the apparatus to be capable of performing the appropriate operations. These include adapting for reception of requests from users for access to hosts, obtaining authenticators for accessing the hosts, determining the type of the hosts, and processing the requests for access. The processing comprises determination resulting the intermediate apparatus to use a first type of authenticator for access to the first type of hosts and a second type of authenticators for access to the second type of hosts.

The intermediate apparatus may selectively request for an authenticator from a security device depending on the determined type of the host. In this case the determination of the type is performed before requesting for an authenticator. Alternatively, the intermediate apparatus may send the host an authenticator basket comprising different types of authenticators. The host can then select one or more authenticators it is adapted to use.

A possibility is that the intermediate has obtained authenticators for the different types of hosts, and determines whether to use an authenticator it has already received from a security device depending on the determined type of the host.

The first type of hosts may comprise legacy hosts and the second type of hosts may comprise cloud hosts. The apparatus may be configured to determine whether the target host is a legacy host or a cloud host. The legacy target hosts do not necessarily support certificate based authentication, or the legacy hosts are not configured to use certificates. Instead, the legacy hosts may operate based on e.g. principal key pairs. For example, "authorized keys" files of target accounts can have been populated with the public keys of the corresponding "Principal Keypairs". The population can be done e.g. in the host provisioning phase. A possibility is to perform the population dynamically using a key management system such as the SSH Universal Key Manager UKM®. The intermediate apparatus can be configured to determine whether the certificate or principal keys based access shall be used. According to an aspect the apparatus is configured to, in response to a request for access to a host, determine the type of the host, and request for a certificate in response to determining that the host is a cloud host, and to use the principal keypairs in response to determining that the host is a legacy host.

Figure 21:
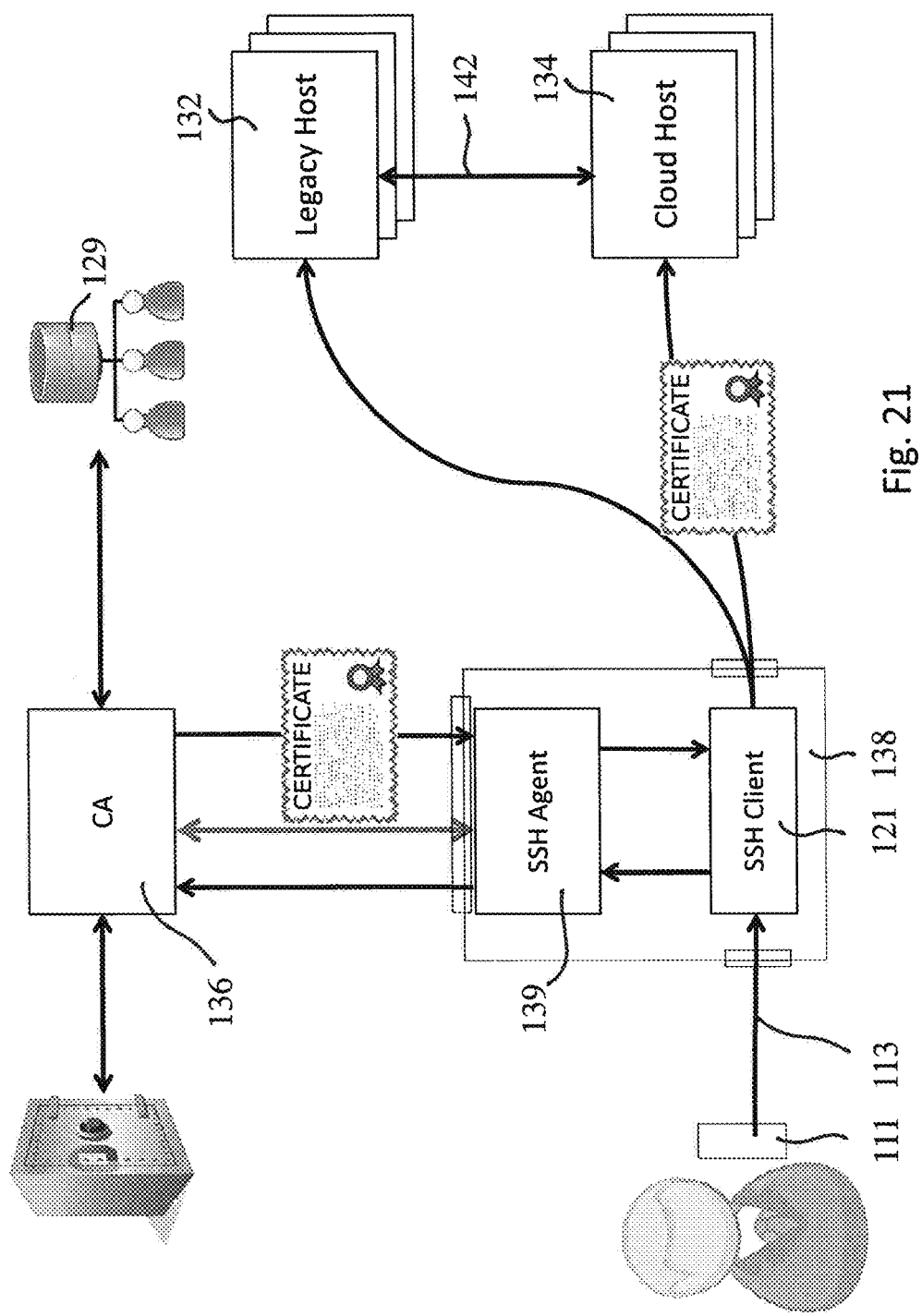

FIG. 21 shows further an access relationship 142 between hosts 132 and 134. As above, it is possible that the user device accesses e.g. host 134 via hosts 132 or vice versa based on this access relationship. Apparently, such an indirect access can be to another node bust such is not shown for clarity.

The intermediate apparatus 138 can be configured to determine whether such an access relationship chain shall be replaced with a direct access relationship between the intermediate device 138 and the host at the end of the chain, and create this relationship accordingly. This may be based on the procedure involving the security device 136 as described above. The intermediate device may also determine that a direct access relationship to one of the hosts shall be replaced by access relationships routed via another node, and take necessary action.

Any of the aspects and elements described herein may be omitted, reordered, or combined to form new embodiments. No ordering on steps of processes or elements of embodiments is implied unless necessary in a particular context (even describing what is done first in a drawing is not intended to impose an ordering constraint in alternative embodiments). Some steps may be implemented as a continuous ongoing process. Any process step may be implemented as computer executable instructions, software modules, digital logic, or computer hardware, or any combination thereof, as applicable. Computer-executable instructions for causing a computer to perform any of the methods may be stored on a non-transitive computer-readable medium (such as RAM, ROM, DVD, file server, web server).

Figure 22:
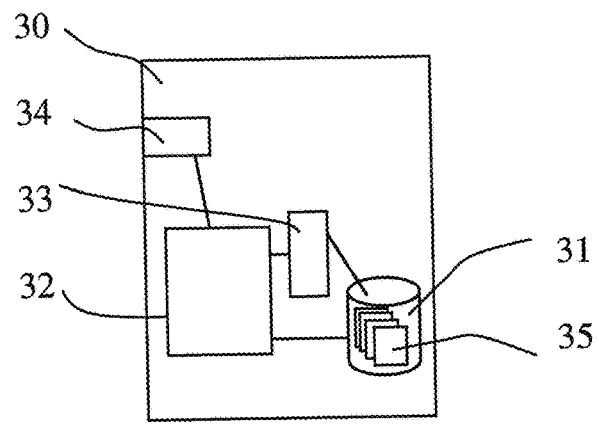
FIGS. 22 and 23 show examples of data processing apparatus for imo0lementing the herein described principles.

FIG. 22 shows an example of control apparatus for a device capable of processing the above described actions of determining information on access relationships, generating and replacing access relationships and taking other control actions. The control apparatus 30 can be for example integrated with, coupled to and/or otherwise controlling the apparatus 10 of FIG. 1, the apparatus 120 of FIG. 20 or 138 of FIG. 21. For this purpose the control apparatus comprises at least one memory 31, at least one data processing unit 32, 33 and an input/output interface 34. The database 31 is shown to comprise therein stored key files 35. Via the interface the control apparatus can be coupled to the transport entities of the respective device. The control apparatus can be configured to execute an appropriate software code to provide the control functions. The control apparatus can also be interconnected with other control entities.

The various embodiments and their combinations or subdivisions may be implemented as methods, apparatuses, or computer program products. Methods for downloading computer program code for performing the same may also be provided. Computer program products may be stored on non-transitory computer-readable media, such as memory chips, or memory blocks implemented within the processor, magnetic media such as hard disk or floppy disks, and optical media such as for example DVD and the data variants thereof, CD, magnetic disk, or semiconductor memory. Method steps may be implemented using instructions operable to cause a computer to perform the method steps using a processor and a memory. The instructions may be stored on any computer-readable media, such as memory or non-volatile storage.

The required data processing apparatus may be provided by means of one or more data processors. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples. The data processing may be distributed across several data processing modules. A data processor may be provided by means of, for example, at least one chip. The memory or memories may be of any type suitable to the local technical environment and may be implemented using any suitable data storage technology, such as semiconductor based memory devices, magnetic memory devices and systems, optical memory devices and systems, fixed memory and removable memory.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Figure 23:
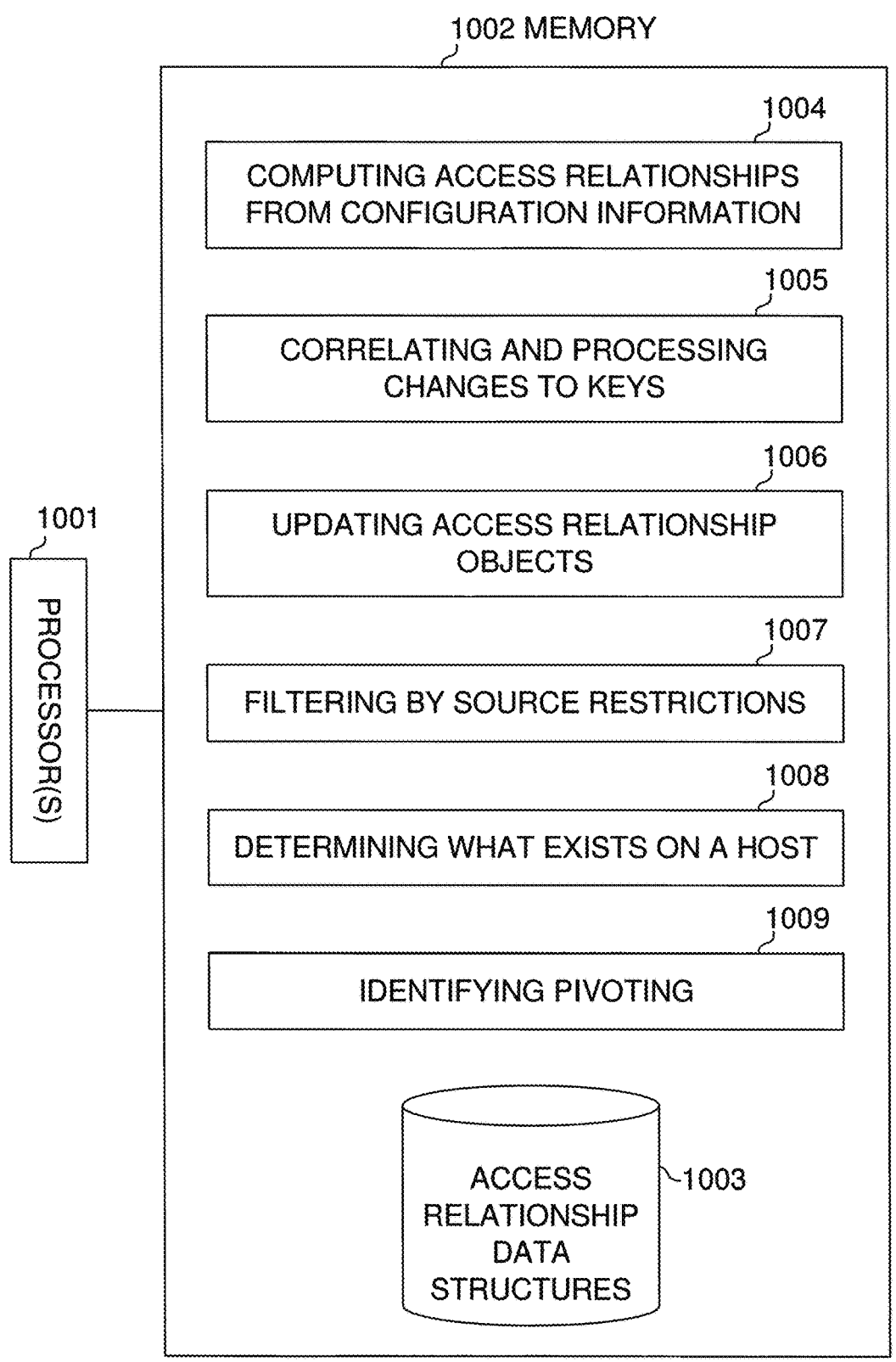

FIG. 23 illustrates a more detailed example of an apparatus comprising one or more computing nodes that together implement one or more of the methods presented herein. The apparatus can be configured to determine chained access relationships and/or direct access relationships and to determine appropriate control operations based thereof. The apparatus may also cause the control operations to take place. For this purpose the apparatus comprises one or more processors 1001 connected to a memory 1002 and various other components of a computer known in the art. The memory is readable by the apparatus and comprises working memory, at least part of which is non-transient (e.g., SDRAM) and non-volatile memory (e.g., magnetic disk or flash memory). The memory comprises a database 1003 comprising access relationship data structures (e.g., access relation objects, user account objects, host objects). The database is advantageously stored in non-volatile memory. The memory also comprises various program code means, such as those for computing various types of access relationships from configuration information 1004, correlating and processing changes to configured keys 1005, updating access relationship objects 1006, filtering access relationships by source restrictions 1007, determining what access relationships exist on a host 1008, and identifying pivoting 1009.

The various aspects, examples and features of various examples discussed above can be combined in manners not specifically shown by the drawings and/or described above.

The foregoing description provides by way of exemplary and non-limiting examples a full and informative description of exemplary embodiments of the invention. However, various modifications and adaptations may become apparent to those skilled in the relevant arts in view of the foregoing description, when read in conjunction with the accompanying drawings and the appended claims. All such and similar modifications of the teachings of this invention will still fall within the spirit and scope of this invention.

I claim:

1. A method for managing trust relationship information stored in a database of trust relationships between entities in a computerised system, the method comprising:
   determining, from the trust relationship information stored in the database of trust relationships, a first trust relationship between a first entity and a second entity,
   selecting, based on a predefined criterion, at least one intermediate entity for a second trust relationship between the first entity and the second entity,
   determining whether it is possible to replace at least a part of the first trust relationship by one or more trust relationships associated with the at least one intermediate entity,
   selectively creating the second trust relationship, the second trust relationship comprising a chain of trust relationships via the first entity, the selected at least one intermediate entity, and the second entity, the selective creating comprising taking into account information of at least one of:
      potential consequences of changing trust relationships between the first entity and the second entity, and
      whether enumerated nodes are associated with communications between the first entity and the second entity, and
   replacing information of the first trust relationship in the database of trust relationships with information of the created second trust relationship in the database of trust relationships.

2. The method of claim 1, comprising routing data between the first entity and the second entity based on said information of the created second trust relationship stored in the database of trust relationships.

3. The method of claim 1, comprising assigning a priority for the created second trust relationship over the first trust relationship.

4. The method of claim 3, comprising switching to the first trust relationship in response to a predefined event.

5. The method of claim 1, wherein the intermediate entity is configured for monitoring and/or auditing data traffic.

6. The method of claim 1, wherein, the selective creating further comprising taking into account information of at least one of:

data traffic through at least one intermediate node in a path between the first entity and the second entity,
policy, rule or setting relating to trust relationships,
input via a user interface,
encryption keys used in association with trust relationships,
one or more encryption algorithms used in association with trust relationships,
approver of at least one trust relationships associated with communications between the first entity and the second entity,
identity of users, hosts, hosts groups and/or other nodes associated with trust relationships between the first entity and the second entity,
security credentials used for communications between the first entity and the second entity,
validity of security credentials used for communications between the first entity and the second entity,
number of hops in communications between the first entity and the second entity,
maximum validity period of trust relationships associated with communications between the first entity and the second entity,
number of users of a node associated with communications between the first entity and the second entity,
number of incoming and/or outgoing trust relationships into and out from one or more nodes associated with communications between the first entity and the second entity,
sameness of trust relationships associated with communications between the first entity and the second entity,
source of originating user identity information, and
software products used in nodes associated with in communications between the first entity and the second entity.

7. The method of claim 1, comprising decrypting by the intermediate entity at least a part of communications between the first entity and the second entity.

8. An apparatus comprising at least one processor, and at least one memory including computer program code, wherein the at least one memory and the computer program code are configured, with the at least one processor, to cause the apparatus to
manage trust relationship information stored in a database of trust relationships,
determine, from the trust relationship information stored in the database of trust relationships, a first trust relationship between a first entity and a second entity,
select, based on a predefined criterion, at least one intermediate entity for a second trust relationship between the first entity and the second entity,
determine whether it is possible to replace at least a part of the first trust relationship by one or more trust relationships associated with the at least one intermediate entity,
selectively create the second trust relationship, the second trust relationship comprising a chain of trust relationships via the first entity, the selected at least one intermediate entity and the second entity, the selective creating comprising taking into account information of at least one of:
potential consequences of changing trust relationships between the first entity and the second entity, and
whether enumerated nodes are associated with communications between the first entity and the second entity, and
replace information of the first trust relationship in the database of trust relationships with information of the created second trust relationship in the database of trust relationships.

9. The apparatus of claim 8, configured to cause routing of data between the first entity and the second entity based on said information of the created second trust relationship stored in the database of trust relationships.

10. The apparatus of claim 8, configured to store the database in the at least one memory.

11. The apparatus of claim 8, configured to prioritize the created second trust relationship over the first trust relationship.

12. The apparatus of claim 11, configured to cause switching to the first trust relationship in response to a predefined event.

13. The apparatus of claim 8, configured to determine that a trust relationship violates a policy, a rule or a setting, and in response thereto cause replacement of information of the first or second trust relationship stored in the database of trust relationships with a non-violating trust relationship.

14. The apparatus of claim 8, comprising one of a key manager and an intermediate data capturing apparatus.

15. A non-transitory computer readable media comprising program code for causing a processor to perform instructions for managing trust relationship information in a computerized network, the instructions performing a method comprising:
managing trust relationship information stored in a database of trust relationships between entities in the computerized network,
determining, from the trust relationship information stored in the database of trust relationships, a first trust relationship between a first entity and a second entity,
selecting, based on a predefined criterion, at least one intermediate entity for a second trust relationship between the first entity and the second entity,
determining whether it is possible to replace at least a part of the first trust relationship by one or more trust relationships associated with the at least one intermediate entity,
selectively creating the second trust relationship, the second trust relationship comprising a chain of trust relationships via the first entity, the at least one selected intermediate entity and the second entity, the selective creating comprising taking into account information of at least one of:
potential consequences of changing trust relationships between the first entity and the second entity, and
whether enumerated nodes are associated with communications between the first entity and the second entity, and
storing information of the created second trust relationship into the database of trust relationships.

* * * * *

UNITED STATES PATENT AND TRADEMARK OFFICE
CERTIFICATE OF CORRECTION

PATENT NO. : 10,389,722 B2  
APPLICATION NO. : 15/394878  
DATED : August 20, 2019  
INVENTOR(S) : Vesa Luukkala Page 1 of 1

It is certified that error appears in the above-identified patent and that said Letters Patent is hereby corrected as shown below:

In the Claims

On Column 35, Line 43:
In Claim 8, after "to", insert --:--

Signed and Sealed this
Twenty-first Day of January, 2020

Andrei Iancu
*Director of the United States Patent and Trademark Office*